(12) United States Patent
Greenberg et al.

(10) Patent No.: US 9,582,917 B2
(45) Date of Patent: Feb. 28, 2017

(54) AUTHORING TOOL FOR THE MIXING OF CARDS OF WRAP PACKAGES

(71) Applicant: Wrap Media, LLC, San Francisco, CA (US)

(72) Inventors: Eric H. Greenberg, Ross, CA (US); Mark E. Rolston, Austin, TX (US); Jared L. Ficklin, Austin, TX (US); John M. Garris, San Francisco, CA (US); Matthew J. Santone, Austin, TX (US)

(73) Assignee: Wrap Media, LLC, San Francisco, CA (US)

( * ) Notice: Subject to any disclaimer, the term of this patent is extended or adjusted under 35 U.S.C. 154(b) by 0 days.

(21) Appl. No.: 15/140,230

(22) Filed: Apr. 27, 2016

(65) Prior Publication Data

US 2016/0284112 A1    Sep. 29, 2016

Related U.S. Application Data

(63) Continuation-in-part of application No. 14/669,395, filed on Mar. 26, 2015, and a continuation-in-part of (Continued)

(51) Int. Cl.
*G06F 17/00* (2006.01)
*G06T 11/60* (2006.01)
(Continued)

(52) U.S. Cl.
CPC ............ *G06T 11/60* (2013.01); *G06F 3/0483* (2013.01); *G06F 3/0485* (2013.01);
(Continued)

(58) Field of Classification Search
CPC ... G06Q 50/01; G06F 17/2247; G06F 17/212; G06F 3/0483
See application file for complete search history.

(56) References Cited

U.S. PATENT DOCUMENTS 5,228,123 A * 7/1993 Heckel .............. G06F 17/30855
707/E17.013
5,659,793 A * 8/1997 Escobar ............ G06F 17/30017
345/629
(Continued)

OTHER PUBLICATIONS

Sarah Sluis, "Harper's Bazaar Pursues Shoppable Ads With Streamwize", http://adexchanger.com/publishers/harpers-bazaar-pursues-shoppable-ads-with-streamwize/, Jul. 24, 2014, downloaded on May 22, 2015.
(Continued)

*Primary Examiner* — Mohammed-Ibrahim Zuberi
(74) *Attorney, Agent, or Firm* — Beyer Law Group LLP

(57) ABSTRACT

An authoring tool for authoring a set of cards of a first wrap package including a card mixing tool for mixing a card from a second wrap package into the first wrap package. The authoring tool further includes a set of authoring component tools for selectively adding components to the one more cards and the mixed card and a sequencing tool for defining one or more sequence orders for the one or more cards and the mixed card in the first wrap package.

17 Claims, 19 Drawing Sheets

Related U.S. Application Data application No. 14/878,148, filed on Oct. 8, 2015, and a continuation-in-part of application No. 14/993,829, filed on Jan. 12, 2016, now Pat. No. 9,465,788.

(60) Provisional application No. 62/211,310, filed on Aug. 28, 2015, provisional application No. 62/248,644, filed on Oct. 30, 2015, provisional application No. 62/298,723, filed on Feb. 23, 2016, provisional application No. 62/210,585, filed on Aug. 27, 2015, provisional application No. 62/325,373, filed on Apr. 20, 2016.

(51) Int. Cl.
| | | |
|---|---|---|
| *G06F 17/24* | (2006.01) | |
| *G06F 3/0485* | (2013.01) | |
| *G06F 17/21* | (2006.01) | |
| *G06F 17/22* | (2006.01) | |
| *G06F 17/30* | (2006.01) | |
| *G06F 3/0483* | (2013.01) | |
| *G06Q 30/06* | (2012.01) | |
| *G06F 3/0481* | (2013.01) | |

(52) U.S. Cl.
CPC ........ *G06F 3/04817* (2013.01); *G06F 17/212* (2013.01); *G06F 17/218* (2013.01); *G06F 17/2229* (2013.01); *G06F 17/2247* (2013.01); *G06F 17/24* (2013.01); *G06F 17/241* (2013.01); *G06F 17/3089* (2013.01); *G06F 17/30893* (2013.01); *G06F 17/30905* (2013.01); *G06Q 30/0643* (2013.01)

(56) References Cited

U.S. PATENT DOCUMENTS

| | | | | |
|---|---|---|---|---|
| 5,880,740 A * | 3/1999 | Halliday | G06T 11/60 | 345/629 |
| 6,021,417 A * | 2/2000 | Massarksy | G06T 11/001 | 345/441 |
| 6,157,935 A * | 12/2000 | Tran | G06F 3/1454 | 382/187 |
| 6,216,112 B1 * | 4/2001 | Fuller | G06Q 30/02 | 705/14.19 |
| 6,321,244 B1 * | 11/2001 | Liu | G06F 17/211 | 715/201 |
| 6,507,865 B1 * | 1/2003 | Hanson | G06Q 10/10 | 705/36 R |
| 6,553,403 B1 * | 4/2003 | Jarriel | H04L 41/048 | 709/202 |
| 6,738,079 B1 * | 5/2004 | Kellerman | G06F 8/38 | 345/674 |
| 7,030,872 B2 * | 4/2006 | Tazaki | G11B 27/034 | 345/418 |
| 7,941,739 B1 * | 5/2011 | Mohammed | G06F 9/5038 | 715/202 |
| 8,255,293 B1 * | 8/2012 | Davies | G06Q 30/0207 | 705/14.49 |
| 8,291,312 B1 * | 10/2012 | Zhou | G06F 17/30902 | 709/203 |
| 8,341,525 B1 * | 12/2012 | Achour | G06Q 10/101 | 715/201 |
| 8,402,356 B2 * | 3/2013 | Martinez | G06F 17/30035 | 705/14.36 |
| 8,412,675 B2 * | 4/2013 | Alvarado | G06Q 10/109 | 707/616 |
| 8,468,126 B2 * | 6/2013 | van Gent | G06F 17/3089 | 707/610 |
| 8,812,528 B1 * | 8/2014 | Pedregal | G06Q 50/01 | 707/758 |
| 8,825,083 B1 * | 9/2014 | Pedregal | G06Q 30/0269 | 455/456.3 |
| 8,832,062 B1 * | 9/2014 | Pedregal | G06F 17/30038 | 707/706 |
| 8,832,127 B1 * | 9/2014 | Pedregal | G06Q 50/01 | 707/706 |
| 8,832,191 B1 * | 9/2014 | LeBeau | H04L 51/10 | 382/209 |
| 8,903,852 B1 * | 12/2014 | Pedregal | G06F 17/30864 | 707/707 |
| 8,990,672 B1 * | 3/2015 | Grosz | H04N 1/00 | 715/202 |
| 9,110,903 B2 * | 8/2015 | Martinez | G06F 17/30035 | |
| 9,275,403 B2 * | 3/2016 | Pedregal | G06Q 30/0282 | |
| 2001/0034746 A1 * | 10/2001 | Tsakiris | G06F 17/21 | 715/243 |
| 2003/0009694 A1 * | 1/2003 | Wenocur | G06Q 10/107 | 726/4 |
| 2003/0041110 A1 * | 2/2003 | Wenocur | G06Q 10/107 | 709/206 |
| 2003/0093572 A1 * | 5/2003 | Laux | G06F 9/5055 | 709/250 |
| 2003/0101092 A1 * | 5/2003 | Fuller | G06Q 30/02 | 705/14.59 |
| 2003/0169282 A1 * | 9/2003 | Herigstad | G06F 3/0236 | 715/700 |
| 2003/0191816 A1 * | 10/2003 | Landress | G06Q 30/02 | 709/219 |
| 2004/0111673 A1 * | 6/2004 | Bowman | G06F 9/4443 | 715/234 |
| 2004/0177327 A1 * | 9/2004 | Kieffer | G06F 17/211 | |
| 2004/0226048 A1 * | 11/2004 | Alpert | H04N 7/17318 | 725/109 |
| 2005/0022116 A1 * | 1/2005 | Bowman | G06F 17/30896 | 715/234 |
| 2005/0027820 A1 * | 2/2005 | O'Laughlen | G06F 17/30876 | 709/217 |
| 2005/0066279 A1 * | 3/2005 | LeBarton | G06T 13/00 | 715/723 |
| 2005/0210416 A1 * | 9/2005 | MacLaurin | G06F 3/0483 | 715/851 |
| 2005/0245241 A1 | 11/2005 | Durand et al. | | |
| 2006/0048076 A1 * | 3/2006 | Vronay | G06F 3/0482 | 715/850 |
| 2006/0156219 A1 * | 7/2006 | Haot | G06F 17/30017 | 715/202 |
| 2006/0230337 A1 * | 10/2006 | Lamont | G06F 17/30241 | 715/202 |
| 2006/0259462 A1 * | 11/2006 | Timmons | G06F 17/30979 | |
| 2007/0028166 A1 * | 2/2007 | Hundhausen | G06F 17/212 | 715/205 |
| 2007/0118801 A1 * | 5/2007 | Harshbarger | G11B 27/031 | 715/730 |
| 2007/0208704 A1 * | 9/2007 | Ives | G06F 17/30905 | |
| 2007/0232399 A1 * | 10/2007 | Kathman | A63F 13/12 | 463/42 |
| 2008/0077852 A1 * | 3/2008 | Fleishman | G06F 9/4443 | 715/234 |
| 2008/0165081 A1 * | 7/2008 | Lawther | G06F 3/1423 | 345/1.2 |
| 2009/0119615 A1 * | 5/2009 | Huang | G06F 3/03547 | 715/786 |
| 2009/0158182 A1 * | 6/2009 | McCurdy | G06Q 30/02 | 715/764 |
| 2009/0192928 A1 * | 7/2009 | Abifaker | G06Q 30/02 | 705/35 |
| 2009/0300511 A1 * | 12/2009 | Behar | G06F 1/162 | 715/745 |
| 2010/0070876 A1 * | 3/2010 | Jain | G06Q 30/02 | 715/748 |
| 2011/0214075 A1 * | 9/2011 | Vongphouthone | G06F 9/542 | 715/760 |
| 2012/0054589 A1 * | 3/2012 | Berger | G06Q 50/01 | 715/202 |
| 2012/0054596 A1 * | 3/2012 | Kroger | G06F 17/3089 | 715/234 |
| 2012/0096357 A1 * | 4/2012 | Folgner | G11B 27/34 | 715/726 |

(56) References Cited

U.S. PATENT DOCUMENTS

| | | | |
|---|---|---|---|
| 2012/0131427 A1* | 5/2012 | Artin | G06F 17/211 715/201 |
| 2012/0150605 A1* | 6/2012 | Isaacson | G06Q 20/10 705/14.25 |
| 2012/0150729 A1* | 6/2012 | Isaacson | G06Q 10/101 705/39 |
| 2012/0150730 A1* | 6/2012 | Isaacson | G06Q 10/101 705/39 |
| 2012/0150731 A1* | 6/2012 | Isaacson | G06Q 10/101 705/39 |
| 2012/0150732 A1* | 6/2012 | Isaacson | G06Q 10/101 705/39 |
| 2012/0150743 A1* | 6/2012 | Isaacson | G06Q 10/101 705/44 |
| 2012/0209902 A1* | 8/2012 | Outerbridge | G06Q 10/101 709/201 |
| 2012/0210200 A1* | 8/2012 | Berger | G06F 3/04845 715/202 |
| 2012/0236201 A1* | 9/2012 | Larsen | H04N 21/235 348/468 |
| 2012/0278704 A1* | 11/2012 | Ying | G06F 17/2247 715/243 |
| 2012/0313876 A1* | 12/2012 | Smith | G06F 9/4443 345/173 |
| 2013/0021377 A1* | 1/2013 | Doll | G09G 5/14 345/649 |
| 2013/0024757 A1* | 1/2013 | Doll | G06F 17/212 715/204 |
| 2013/0046781 A1* | 2/2013 | Frankel | G06Q 30/02 707/769 |
| 2013/0061160 A1* | 3/2013 | Tseng | G06F 17/30905 715/760 |
| 2013/0073387 A1* | 3/2013 | Heath | G06Q 50/01 705/14.53 |
| 2013/0073388 A1* | 3/2013 | Heath | G06Q 50/01 705/14.53 |
| 2013/0073389 A1* | 3/2013 | Heath | G06Q 50/01 705/14.54 |
| 2013/0073400 A1* | 3/2013 | Heath | G06Q 30/02 705/14.73 |
| 2013/0073473 A1* | 3/2013 | Heath | G06Q 30/02 705/319 |
| 2013/0097186 A1* | 4/2013 | van Hoff | G06F 17/3064 707/749 |
| 2013/0099447 A1* | 4/2013 | Patton | A63F 1/02 273/293 |
| 2013/0111395 A1* | 5/2013 | Ying | G06F 3/0483 715/783 |
| 2013/0144707 A1* | 6/2013 | Isaacson | G06Q 30/0227 705/14.28 |
| 2013/0151959 A1* | 6/2013 | Flynn, III | G06Q 10/10 715/702 |
| 2013/0166445 A1* | 6/2013 | Isaacson | G06Q 30/0234 705/41 |
| 2013/0179761 A1* | 7/2013 | Cho | G06F 17/21 715/202 |
| 2013/0219255 A1* | 8/2013 | van Hoff | G06F 17/2235 715/205 |
| 2013/0223819 A1* | 8/2013 | Sims | G06F 17/30017 386/282 |
| 2013/0246261 A1* | 9/2013 | Purves | G06Q 20/105 705/41 |
| 2013/0254063 A1* | 9/2013 | Stone | G06Q 30/0603 705/26.5 |
| 2013/0254705 A1* | 9/2013 | Mooring | G06F 3/0488 715/784 |
| 2013/0268372 A1* | 10/2013 | Jalili | G06Q 30/0277 705/14.66 |
| 2013/0282605 A1* | 10/2013 | Noelting | G06Q 10/1053 705/321 |
| 2013/0283194 A1* | 10/2013 | Kopp | G06F 3/0481 715/764 |
| 2013/0290887 A1* | 10/2013 | Sun | G06F 3/0482 715/769 |
| 2013/0305218 A1* | 11/2013 | Hirsch | G06F 8/36 717/106 |
| 2013/0311870 A1* | 11/2013 | Worsley | G06F 17/30952 715/234 |
| 2013/0316773 A1* | 11/2013 | Boyd | G11B 27/031 463/9 |
| 2013/0319209 A1* | 12/2013 | Good | G09B 15/04 84/483.2 |
| 2013/0325671 A1* | 12/2013 | Glass | G06Q 30/0641 705/27.1 |
| 2013/0339830 A1* | 12/2013 | Yuan | G06F 3/0485 715/209 |
| 2013/0346302 A1* | 12/2013 | Purves | G06Q 20/102 705/40 |
| 2014/0032525 A1* | 1/2014 | Merriman | G06F 17/30283 707/713 |
| 2014/0033047 A1* | 1/2014 | Poling | G06F 3/048 715/730 |
| 2014/0047413 A1* | 2/2014 | Sheive | H04L 65/403 717/110 |
| 2014/0068665 A1* | 3/2014 | Evans | H04N 21/4781 725/37 |
| 2014/0074624 A1 | 3/2014 | Ying et al. | |
| 2014/0074863 A1 | 3/2014 | Walkingshaw et al. | |
| 2014/0074934 A1* | 3/2014 | van Hoff | G06F 17/3053 709/204 |
| 2014/0075275 A1* | 3/2014 | Aleksandrovsky | G06F 17/2229 715/202 |
| 2014/0075289 A1* | 3/2014 | Brant | G06F 17/217 715/234 |
| 2014/0075339 A1* | 3/2014 | Weskamp | H04L 65/403 715/753 |
| 2014/0087780 A1* | 3/2014 | Abhyanker | G06Q 50/01 455/521 |
| 2014/0089789 A1* | 3/2014 | Schowtka | G06F 17/248 715/243 |
| 2014/0089804 A1* | 3/2014 | Gazit | G06F 3/0484 715/723 |
| 2014/0096014 A1* | 4/2014 | Johnson | H04L 41/22 715/733 |
| 2014/0101539 A1* | 4/2014 | Ma | G06F 17/2247 715/235 |
| 2014/0108289 A1* | 4/2014 | Eitan | G06Q 50/01 705/342 |
| 2014/0109046 A1* | 4/2014 | Hirsch | G06F 9/44 717/120 |
| 2014/0114866 A1* | 4/2014 | Abhyanker | G06Q 50/01 705/307 |
| 2014/0129942 A1* | 5/2014 | Rathod | H04N 21/44222 715/720 |
| 2014/0164507 A1* | 6/2014 | Tesch | H04L 51/10 709/204 |
| 2014/0165091 A1* | 6/2014 | Abhyanker | G06Q 30/02 725/27 |
| 2014/0173417 A1* | 6/2014 | He | G06F 17/2247 715/234 |
| 2014/0198127 A1* | 7/2014 | Ying | G06T 11/60 345/600 |
| 2014/0210843 A1* | 7/2014 | VanCuren, Jr. | G06T 11/001 345/589 |
| 2014/0245128 A9* | 8/2014 | Brant | G06F 17/248 715/234 |
| 2014/0245369 A1* | 8/2014 | Green | H04N 21/2368 725/116 |
| 2014/0250001 A1* | 9/2014 | Isaacson | G06Q 20/22 705/39 |
| 2014/0250002 A1* | 9/2014 | Isaacson | G06Q 20/342 705/39 |
| 2014/0287779 A1* | 9/2014 | O'Keefe | H04W 4/02 455/456.3 |
| 2014/0320535 A1* | 10/2014 | Ying | G06T 15/205 345/649 |
| 2014/0344294 A1* | 11/2014 | Skeen | H04L 65/4084 707/754 |

(56) References Cited

U.S. PATENT DOCUMENTS

| | | | | | |
|---|---|---|---|---|---|
| 2014/0351268 | A1* | 11/2014 | Weskamp | | G06F 17/217 |
| | | | | | 707/748 |
| 2015/0020170 | A1* | 1/2015 | Talley | | H04L 63/08 |
| | | | | | 726/4 |
| 2015/0033102 | A1* | 1/2015 | Losvik | | G06F 17/21 |
| | | | | | 715/202 |
| 2015/0058709 | A1* | 2/2015 | Zaletel | | H04L 65/608 |
| | | | | | 715/202 |
| 2015/0066743 | A1* | 3/2015 | Gerard | | G06Q 20/227 |
| | | | | | 705/39 |
| 2015/0088655 | A1* | 3/2015 | Taylor | | G06Q 30/0633 |
| | | | | | 705/14.61 |
| 2015/0100587 | A1* | 4/2015 | Walkingshaw | ... | G06F 17/30873 |
| | | | | | 707/748 |
| 2015/0106225 | A1* | 4/2015 | Glass | | G06Q 20/12 |
| | | | | | 705/26.7 |
| 2015/0106368 | A1* | 4/2015 | Sohn | | G06Q 10/10 |
| | | | | | 707/732 |
| 2015/0120767 | A1* | 4/2015 | Skeen | | G06F 17/30752 |
| | | | | | 707/754 |
| 2015/0131973 | A1* | 5/2015 | Rav-Acha | | G11B 27/031 |
| | | | | | 386/285 |
| 2015/0134687 | A1* | 5/2015 | Sohn | | H04L 65/403 |
| | | | | | 707/758 |
| 2015/0149353 | A1* | 5/2015 | Linden | | G06Q 20/28 |
| | | | | | 705/41 |
| 2015/0172778 | A1* | 6/2015 | Soon-Shiong | | H04N 21/4826 |
| | | | | | 725/56 |
| 2015/0193857 | A1* | 7/2015 | Reed | | G06Q 30/0633 |
| | | | | | 705/26.8 |
| 2015/0213001 | A1* | 7/2015 | Levy | | G06F 17/3005 |
| | | | | | 715/202 |
| 2015/0262036 | A1* | 9/2015 | Song | | G06F 17/3002 |
| | | | | | 382/159 |
| 2015/0296033 | A1* | 10/2015 | Jung | | H04L 65/4069 |
| | | | | | 709/217 |
| 2015/0356649 | A1* | 12/2015 | Glass | | G06Q 20/12 |
| | | | | | 705/26.1 |
| 2016/0034437 | A1* | 2/2016 | Yong | | G06Q 30/0241 |
| | | | | | 715/202 |
| 2016/0062955 | A1* | 3/2016 | Maertens | | H04W 4/20 |
| | | | | | 715/202 |
| 2016/0063486 | A1* | 3/2016 | Purves | | G06Q 20/36 |
| | | | | | 705/35 |
| 2016/0063580 | A1* | 3/2016 | Greenberg | | G06Q 30/0282 |
| | | | | | 705/347 |
| 2016/0086218 | A1* | 3/2016 | Li | | H04L 51/32 |
| | | | | | 705/14.51 |

OTHER PUBLICATIONS

Paul Adams, "The End of Apps as We Know Them", https://blog.intercom.io/the-end-of-apps-as-we-know-them/, published around Nov. 2014, downloaded on May 22, 2015.
Paul Adams, "Why Cards are the Future of the Web", https://blog.intercom.io/why-cards-are-the-future-of-the-web/, published around Sep. 2013, downloaded on May 22, 2015.
Allison Schiff, "Sharethrough Brings Its Version of Twitter Cards to the Masses", http://adexchanger.com/native-advertising-2/sharethrough-brings-its-version-of-twitter-cards-to-the-masses/, Dec. 17, 2014, downloaded on May 26, 2015.
Sarah Perez, "Storytelling App Steller Becomes More of a Social Network", http://techcrunch.com/2014/08/21/storytelling-app-steller-becomes-more-of-a-social-network/, Aug. 21, 2014, downloaded on May 26, 2015.
Kaylene Hong, "Steller is a Beautiful Visual Storytelling App, Similar to Storehouse, but for Your iPhone Instead", http://thenextweb.com/apps/2014/03/13/steller-is-a-beautiful-visual-storytelling-app-similar-to-storehouse-but-for-your-iphone-instead/, Mar. 13, 2014, downloaded on May 27, 2015.
Jayanth Prathipati, "Why Do All Mobile Roads Lead Back to the Palm Pre?", http://thetechblock.com/mobile-roads-lead-back-palm-pre/, published on Jun. 11, 2014, downloaded on May 27, 2015.
Pictela, "Introduction to Pictela", http://www.pictela.com/docs/getting-started/introduction-to-pictela, from Wayback Machine indicating Wayback retrieval date of Mar. 18, 2015, downloaded on Jun. 5, 2015. (Pictela_Intro).
Pictela, https://web.archive.org/web/20130908132533/http://www.pictela.com/formats, from Wayback Machine indicating Wayback retrieval date of Sep. 8, 2013, downloaded on Jun. 5, 2015. (Pictela_Formats).
Twitter, https://web.archive.org/web/20150324121730/https://dev.twitter.com/cards/getting-started, from Wayback Machine indicating Wayback retrieval date of Mar. 24, 2015, downloaded on Jun. 5, 2015. (Twitter_Getting_Started).
Twitter, https://web.archive.org/web/20140929154946/https://dev.twitter.com/cards/overview, from Wayback Machine indicating Wayback retrieval date of Sep. 29, 2014, downloaded on Jun. 5, 2015. (Twitter_Overview).
Max Bulger, "Why Cards?", http://blog.trywildcard.com/post/93983166893/why-cards, published on Aug. 6, 2014, downloaded on May 26, 2015.
Streamwize, http://www.streamwize.com, downloaded on May 22, 2015. (Streamwise).
Streamwize, https://web.archive.org/web/20141222085204/http://www.streamwize.com/#introduction, from Wayback Machine indicating Wayback retrieval date of Dec. 22, 2014, downloaded on Jun. 5, 2015. (Streamwize V2).
Steller, "Everyone has a story to tell. Tell yours with photos, videos and texts", https://steller.co, from Wayback Machine indicating Wayback retrieval date of Apr. 5, 2014, downloaded on Jun. 5, 2015.
Max Bulger, "Introducing the Wildcard iOS SDK", http://blog.trywildcard.com/, Feb. 23, 2015, downloaded on May 26, 2015.
Wildcard, http://www.trywildcard.com/, from Wayback Machine indicating Wayback retrieval date of Feb. 8, 2014, downloaded on Jun. 5, 2015. (WC_homepage).
Wildcard, https://web.archive.org/web/20141115090135/http://www.trywildcard.com/docs/intro, from Wayback Machine indicating Wayback retrieval date of Nov. 15, 2014, downloaded on Jun. 5, 2015. (intro V1).
Wildcard, https://web.archive.org/web/20150321155952/http://www.trywildcard.com/docs/intro, from Wayback Machine indicating Wayback retrieval date of Mar. 21, 2015, downloaded on Jun. 5, 2015. (intro V2).
Wildcard, https://web.archive.org/web/20141115171158/http://www.trywildcard.com/docs/overview, from Wayback Machine indicating Wayback retrieval date of Nov. 15, 2014, downloaded on Jun. 5, 2015. (arch Overview V1).
Wildcard, https://web.archive.org/web/20150321162417/http://www.trywildcard.com/docs/overview, from Wayback Machine indicating Wayback retrieval date of Mar. 21, 2015, downloaded on Jun. 5, 2015. (arch overview V2).
Wildcard, https://web.archive.org/web/20150520042344/http://www.trywildcard.com/docs/overview/, from Wayback Machine indicating Wayback retrieval date of May 20, 2015, downloaded on Jun. 5, 2015. (arch overview V3).
Wildcard, https://web.archive.org/web/20141115090625/http://www.trywildcard.com/docs/sdk/quickstart_sdk, from Wayback Machine indicating Wayback retrieval date of Nov. 15, 2014, downloaded on Jun. 5, 2015. (SDK_QS_V1).
Wildcard, https://web.archive.org/web/20150321172000/http://www.trywildcard.com/docs/sdk/quickstart_sdk, from Wayback Machine indicating Wayback retrieval date of Mar. 21, 2015, downloaded on Jun. 5, 2015. (SDK_QS_V2).
Wildcard, https://web.archive.org/web/20141115090143/http://www.trywildcard.com/docs/sdk/java_sdk, from Wayback Machine indicating Wayback retrieval date of Nov. 15, 2014, downloaded on Jun. 5, 2015. (WC_Java_V1).
Wildcard, https://web.archive.org/web/20150321184716/http://www.trywildcard.com/docs/sdk/java_sdk, from Wayback Machine indicating Wayback retrieval date of Mar. 21, 2015, downloaded on Jun. 5, 2015. (WC_Java_V2).

(56) References Cited

OTHER PUBLICATIONS

Wildcard, https://web.archive.org/web/20141115090150/http://www.trywildcard.com/docs/sdk/ruby_sdk, from Wayback Machine indicating Wayback retrieval date of Nov. 15, 2014, downloaded on Jun. 5, 2015. (WC_Ruby_V2).

Wildcard, https://web.archive.org/web/20150321180400/http://www.trywildcard.com/docs/sdk/ruby_sdk, from Wayback Machine indicating Wayback retrieval date of Mar. 21, 2015, downloaded on Jun. 5, 2015. (WC_Ruby).

Wildcard, https://web.archive.org/web/20141115090647/http://www.trywildcard.com/partners, from Wayback Machine indicating Wayback retrieval date of Nov. 15, 2014, downloaded on Jun. 5, 2015. (WC_Partners_V1).

Wildcard, https://web.archive.org/web/20150315070647/http://www.trywildcard.com/partners, from Wayback Machine indicating Wayback retrieval date of Mar. 15, 2015, downloaded on Jun. 5, 2015. (WC_Partners_V2).

Wildcard, https://web.archive.org/web/20141126020058/http://www.trywildcard.com/docs/faq/, from Wayback Machine indicating Wayback retrieval date of Nov. 26, 2014, downloaded on Jun. 5, 2015. (FAQ_V1).

Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Tutorials_V1).

Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Sample_Projects_V1).

Wildcard, https://web.archive.org/web/20141115171308/http://www.trywildcard.com/docs/schema, from Wayback Machine indicating Wayback retrieval date of Nov. 15, 2014, downloaded on Jun. 5, 2015. (WC_Card_Schema_V1).

Wildcard, https://web.archive.org/web/20150518060819/http://www.trywildcard.com/docs/schema, from Wayback Machine indicating Wayback retrieval date of May 18, 2015, downloaded on Jun. 5, 2015. (WC_Card_Schema_V2).

Wildcard, http://www.trywildcard.com/docs/faq#shopify, not available on Wayback Machine, downloaded on Jun. 5, 2015. (WC_FAQ_V2).

Jacqueline Thomas, A Serious Look At Card Based Design, [retrieved on Nov. 17, 2015].Retrieved from the internet: http://webdesignledger.com/card-based-design.Jun. 12, 2014.

Hypercard.org, http://web.archive.org/web/20121114055910/http://hypercard.org/hypercard_file_format.php, from Wayback Machine indicating Wayback retrieval date of Nov. 14, 2012, downloaded on Jun. 13, 2016.

Vito Tardia, "Building ePub with PHP and Markdown", https://www.sitepoint.com/building-epub-with-php-and-markdown/, Mar. 1, 2013.

Siegman et al., "Epub Zero, A Collection of Interesting Ideas", https://dauwhe.github.io/epub-zero/#compare, Sep. 28, 2015.

Gylling et al., "EPUB 3 Fixed-Layout Documents", http://www.idpf.org/epub/fxl/#dimensions, International Digital Publishing Forum, 2012.

Adobe InDesign CC, "How to Design Fixed Layout EPUB", https://web.archive.org/web/20140626152711/https://helpx.adobe.com/indesign/how-to/ebook-fixed-layout.html, from Wayback Machine indicating Wayback retrieval date of Jun. 26, 2014, downloaded on Sep. 13, 2016.

Gardeur et al., "Collection + JSON vs collection in EPUB", https://groups.google.com/forum/#!topic/epub-working-group/2aK4-jezWNE, Apr. 18, 2016.

\* cited by examiner

PROPERTIES AND PERMISSIONS

| WRAP PACKAGE | SHARE | EDIT | DELETE | MIX | PUBLIC/PRIVATE |
|---|---|---|---|---|---|
| Name | Yes ☐ No ☐ | Yes ☐ No ☐ | Yes ☐ No ☐ | Yes ☐ No ☐ | Yes ☐ No ☐ |
| | SHARE | EDIT | DELETE | MIX | Public/Private |
| CARD 1 | Yes ☐ No ☐ | Yes ☐ No ☐ | Yes ☐ No ☐ | Yes ☐ No ☐ | Yes ☐ No ☐ |
| CARD 2 | Yes ☐ No ☐ | Yes ☐ No ☐ | Yes ☐ No ☐ | Yes ☐ No ☐ | Yes ☐ No ☐ |
| CARD 3 | Yes ☐ No ☐ | Yes ☐ No ☐ | Yes ☐ No ☐ | Yes ☐ No ☐ | Yes ☐ No ☐ |
| ... | | | | | |
| CARD N | Yes ☐ No ☐ | Yes ☐ No ☐ | Yes ☐ No ☐ | Yes ☐ No ☐ | Yes ☐ No ☐ |
| ADD TAG: | | | | | |

*FIG. 8*

AUTHORING TOOL FOR THE MIXING OF CARDS OF WRAP PACKAGES

CROSS REFERENCE TO RELATED APPLICATIONS

This application claims priority to U.S. Provisional Application No. 62/211,310 (P025P), filed Aug. 28, 2015; 62/248,644 (P025P2), filed on Oct. 30, 2015; 62/298,723 (P025P3), filed on Feb. 23, 2016; 62/210,585 (P005P6), filed on Aug. 27, 2015, and 62/325,373 (P005P7), filed on Apr. 20, 2016.

This application is a Continuation in Part of U.S. application Ser. No. 14/669,395 (P005), filed on Mar. 26, 2015; Ser. No. 14/878,148 (P005X1), filed Oct. 8, 2015 and Ser. No. 14/993,829 (P016I), filed on Jan. 12, 2016.

All of the above-referenced patent applications are incorporated herein by reference in their entirety, including any appendices

BACKGROUND

This invention relates to delivering content over networks in the form of wrap packages of cards, and more particularly, to wrap package authoring tool that enables the mixing of one or more cards from existing wrap packages into a wrap package being authoring.

Media content developers have a variety of authoring tools, document formats and content delivery schemes that can be used to create and present media content to users over networks, such as the Internet. The content may be presented to users through a variety of mechanisms, including via web-sites, through the use of a mobile application (i.e., an "app") and downloadable documents such as PDF files. Each of these delivery mechanisms, however, has limitations, particularly within a mobile computing environment.

PDF files, while relatively simple to author, have a number of limitations. The content of PDF files is static. Once created and delivered to a user over a network, there is no way for the viewer to interact, through the PDF file, with the distributor. For example, retailers commonly create PDF versions of product catalogs, which are distributed via a web page or email. When the PDF file is opened, the document is limited to only viewing. The viewer is unable to interact through the PDF file with the retailer, for instance, to ask questions about a particular item or to make a purchase. Also since PDFs are not dynamic documents, they need to be delivered to a consuming device as a single binary block. As a result. PDFs, especially if they are graphic intensive, are typically large files, which may be difficult to distribute, especially over wireless networks to mobile devices. Furthermore, most PDF files are created for viewing on desktop computers, which have relatively large display screens. As a result, the viewing of these PDF files on a mobile device, such as a mobile phone with a relatively small viewing screen, often provides a poor user experience.

There are a number of advantages and disadvantages of using web sites for presenting media content to users. Web sites are typically "destinations", meaning a potential viewer is usually required to navigate to the web site to consume its content and functionality. Web sites are thus generally not considered as portable objects that can be readily delivered to consumers and other viewers, similar to messages. In addition, web sites are typically optimized for desktop computing, providing a rich opportunity for user interaction. With mobile devices, however, particularly mobile phones or wearable computing devices such as smart watches, small display screens and limited input/output capabilities, often results in a poor user experience. When viewing a web site through a screen on a mobile phone for example, it is often very difficult to read text and view images. It is also very difficult to input data and navigate from one web page to another. As a result, the user experience of accessing and viewing web sites on mobile computing devices is often frustrating, resulting in a poor user experience. In addition, the authoring of highly interactive, content-driven, web sites designed to create a positive user experience often requires a high degree of software expertise and sophistication. As a result, the creation of web sites designed for Internet commerce, for instance, is often very expensive and beyond the financial means of many small businesses and organizations.

More recently with the proliferation of "smart" mobile phones and tablets, mobile applications (often referred to as "apps") have become exceedingly popular. Mobile apps are typically "stand alone" or monolithic software programs, designed to perform a specific task or function, and intended to run on smart phones, tablet computers and other mobile devices. An extremely wide variety of apps are now commonplace, such as productively tools like email, calendars, etc., gaming, GPS services such as Google Maps, text and/or voice messaging, live communication such as Skype, online banking, etc., to name just a few. With their growing popularity, to a significant degree, apps have replaced web sites as the preferred method for content providers to create and distribute media content to mobile computing device users.

Apps also have many advantages and disadvantages. On the positive side, apps often provide content-rich, rewarding, user experiences, particularly on mobile devices. A well-designed app allows users to sequence through a number of views, presenting content to users in an orderly fashion. On the negative side, apps are typically "stand alone" software applications that do not easily interact with other software applications. As result, the functionality of apps is often limited, typically only capable of performing the specific task(s) that they were designed to perform, and working only with the specific endpoints contemplated at the time they were developed. As a result, it is often difficult, although not impossible, to create the necessary integration functionality for a user to purchase a product and/or service through the app. Also, the design and authoring of apps is typically very complex and requires a very high level of design engineering expertise to create apps that are professional-looking and appealing. In addition, apps typically are not cross-platform. App developers usually have to create and distribute multiple versions of the same app for the iOS/Apple, Android/Google and the Microsoft platforms for example. As a result, the development and maintenance costs associated with creating and distributing an app is complex and very expensive. Finally, apps typically have to be distributed through an application aggregator, such as the Apple App Store or Google Play. Apps, therefore, typically cannot be directly downloaded from the author/creator to users or consumers.

A system and method for more effectively distributing media content, application functionality and e-commerce related services is therefore needed.

SUMMARY

Systems and methods for creating and delivering wrapped packages of cards are disclosed. With wrap packages, each card is selectively authored to include content such as (i) multi-media, (ii) application functionality and/or (iii) e-commerce related services. In addition, the cards are authored into one or more linear sequences. In optional embodiments, the content can further be authored to convey a "narrative" or "story" that unfolds as the cards are sequentially browsed in their linear order(s), similar to the turning of the pages of a book or magazine. Thus, when the wrap is consumed, the viewer experience is enhanced and is more engaging compared to other types of content delivery methods, such as web sites, PDFs, or applications, particularly on mobile devices. As a result, it is more likely that viewers will consume the media and partake in the functionality and/or services delivered through a wrap compared to the above-listed prior art content delivery types.

In addition, wrap packages are highly portable objects that can be distributed similar to electronic messages, posts in social media feeds, or banner ads appearing in web sites. With these attributes, it is easy to widely circulate wraps, particularly to mobile phones. By widely disseminating wrap packages to mobile phones, content publishers, marketing firms, e-retailers, service providers, consumers and individuals alike can readily create and deliver compelling narratives—precisely where it matters the most—where many people now spend much of their time and consciousness. Wraps thus have the unique ability to transform the mobile phone into a powerful business and social media tool by intimately contacting consumers and individuals at their point of immediacy.

The present application is particularly directed to an authoring tool including a mixing tool for selecting a card from an existing wrap package and mixing it into a wrap package that is being authored. The authoring tool also includes a new card tool for creating and adding one or more cards to the wrap package being authored, a set of component tools for selectively adding components to the one more cards including the mixed card, and optionally a sequencing tool for defining one or more sequence orders for the one or more cards and the mixed card of the wrap package.

In a non-exclusive embodiment, the authoring tool is further configured to generate a JSON wrap descriptor for the wrap package being authored. In this embodiment, the wrap descriptor defines the content, layout and structure of the cards of the wrap package and includes a set of JSON card descriptors defining the content, layout and structure of a corresponding card, including the mixed card, respectively. In other embodiments, wrap descriptors can be represented in other formats. For instance, a wrap descriptor may be formatted using markup languages, such as XML.

In yet another non-exclusive embodiment, an overlay layer is created for the mixed card in the wrap package and any components added to customize the mixed card are applied to the overlay. As a result, the custom components are rendered with the mixed card at runtime, while leaving the underlying mixed card intact.

BRIEF DESCRIPTION OF THE DRAWINGS

The invention and the advantages thereof, may best be understood by reference to the following description taken in conjunction with the accompanying drawings in which:

FIG. 8 illustrates a mixing tool for setting permissions for others to mix one or more cards of a wrap package into other wrap packages accordance with a non-exclusive embodiment of the invention.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
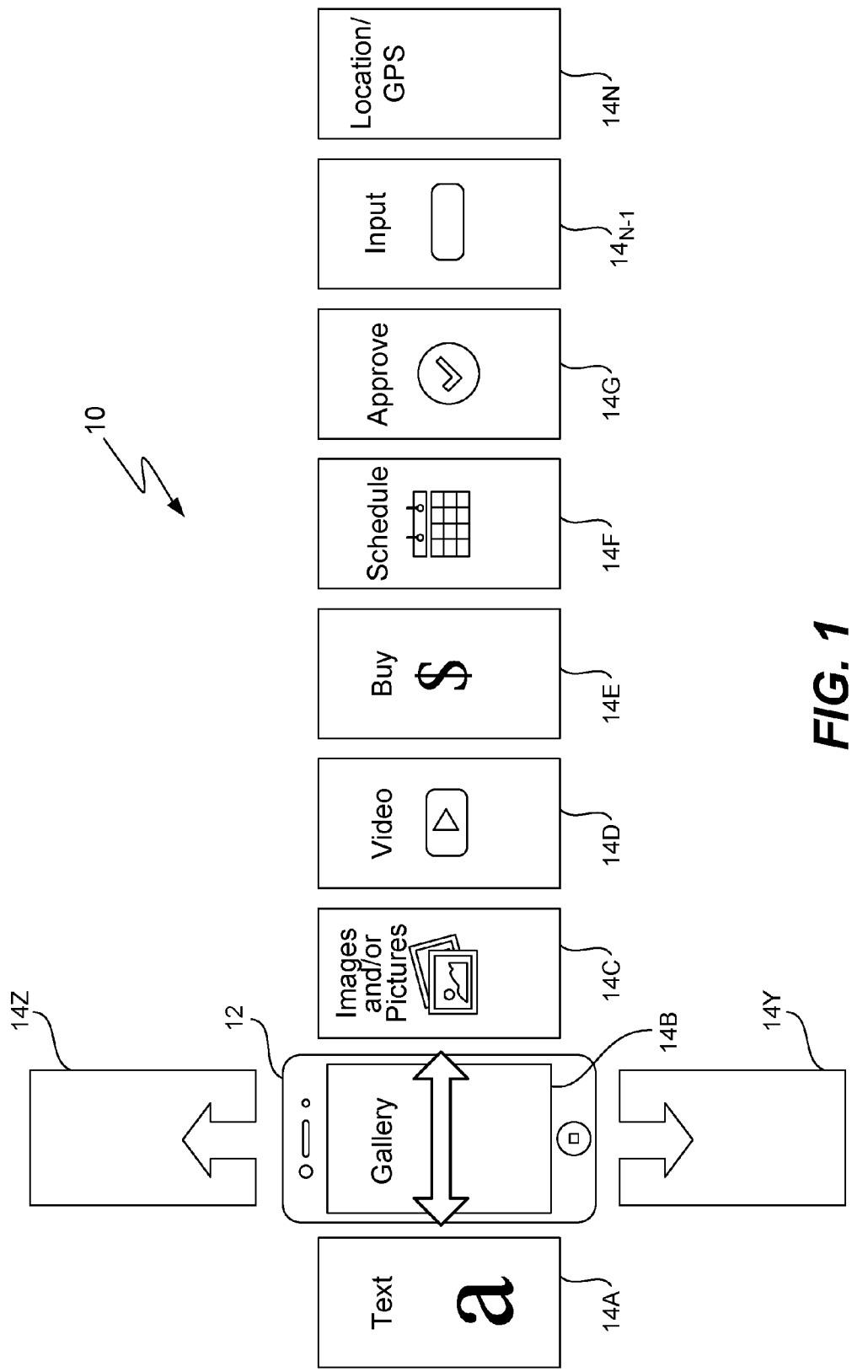
FIG. 1 is a diagram illustrating a representative wrap package that includes a plurality of cards threaded together so as to be viewable in linear arrays in accordance with the principles of the present invention.

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The present disclosure is directed to the mechanisms that support the distribution of media content, and a corresponding palette of application functionality and/or e-commerce related services, in the form of wrapped packages of cards (interchangeably referred to herein as a "wrap", "package" or "wrap package").

A wrap package, which includes a set of cards arranged in one or more predefined sequences, is a unique delivery mechanism for the distribution of authored content and functionality. Wraps are typically characterized by the following:

(a) Each card is selectively authored to include media, such as text, photos, images, video, documents, etc. Since the cards are arranged in their one or more sequences, the media can be authored to convey a "story telling" narrative that unfolds as the cards are sequentially browsed;

(b) The cards of wraps can also be selectively authored to include web or application like functionality;

(c) The layout of the content of any particular card is generally immutable. That is, the positional relationship between the displayed components of any given card typically remains the same, regardless of the size, width, height, or type of display on which the wrap is rendered;

(d) The cards of a wrap all have a defined presentational aspect ratio (typically, but not necessarily, a portrait view);

(e) Wraps are designed for, although not necessarily limited to, mobile. On mobile devices having touch sensitive screens, the cards of wraps are navigated by swipe-browsing. Wraps thus mimic the way people already use their smartphones and other mobile devices such as tablets. Every swipe reveals a new card with a "bite-size" message and/or content.

As the cards are sequentially swiped during consumption, the story-telling narrative of the wrap unfolds. In addition, the user experience in viewing a given wrap is almost always the same, regardless of the type of viewing device, since each card is immutable and maintains the defined aspect at runtime.

An advantage of wraps is that they do not require a dedicated infrastructure for distribution and viewing. By using wrap identifiers, such as URLs, wraps can be distributed to a specific individual or widely to many either by including the wrap identifiers in messages (e.g., emails, texts, etc.), by posting in social media feeds (e.g., Facebook, Twitter, etc.), and/or embedding in online advertisements, etc. The ability to easily share and distribute wraps over already pervasive communication channels is likely to increase the possibility of (i) wraps in general becoming ubiquitous in the mobile economy and (ii) individual wraps going "viral".

Consumers and individuals now spend vast amounts of their time and consciousness on their mobile phones and tablets. As a result, the ability to easily distribute wraps to mobile devices helps brands intimately deliver elegant, user experiences, precisely where it matters the most. Wraps thus have the ability to transform mobile devices into powerful business and/or social media tools. By delivering wraps to mobile devices, it helps brands sell more and build recognition, relationships and loyalty among customers.

In most situations, all that is needed to view a wrap is a browser. When a wrap is requested for viewing, a runtime viewer is provided along with a wrap descriptor. On the consuming device, the runtime viewer is arranged to de-serialize the cards of the wrap descriptor and to generate a runtime instance of the wrap. In other situations, the runtime viewer may already be included in a native application residing on the consuming device.

Wraps are thus a groundbreaking, mobile-first, storytelling and e-commerce platform. By making it simple, inexpensive, and easy to (i) author narrative wraps with interactive functionality and (ii) to distribute wraps like messages, wraps have the unique ability to:

(a) "democratize" the mobile web by providing a powerful, low barrier, low cost alternative to apps and web sites;

(b) unlock the vast story-telling potential of the Internet, and (c) drive e-commerce by building customer relationships and increasing web conversion rates via the interactive functionality provided in wraps.

Wraps thus solve many of the problems and limitations associated with the existing methods for distributing content and conducting e-commerce, such as PDF files, web sites, dedicated apps, and the like. With all these benefits, wraps have the potential of becoming ubiquitous, ushering in a new paradigm referred to herein as the "Narrative Web".

A wrap descriptor is composed of a set of card descriptors, each defining a structure, layout and content of an associated card. The wrap descriptor may also include various wrap level components, attributes, behavior declarations and/or metadata.

Wrap and/or card descriptors will often separate content from their presentation.

In addition, descriptors with content of any appreciable size will typically reference these asset(s), as opposed to incorporating them into the descriptor itself. With this approach, the runtime viewer is responsible for obtaining the external assets at runtime. Wraps are thus "lightweight", meaning they are easier to download and distribute over mobile and cellular networks, which tend to be relatively low bandwidth.

Each card descriptor also commonly includes component descriptor(s) identifying the component(s) in the card and any behaviors or other attributes associated with such component(s). Behaviors are often declared rather than being explicitly defined within the descriptors. Thus, the runtime viewer is responsible for associating the behaviors declared in the descriptor with their associated components in the runtime instance. In other embodiments, card behaviors can be authored inline or otherwise associated with the cards.

In accordance with various embodiments, wrap packages can be consumed either within a browser or a native application (i.e., an "app") running on a client device. In the case of the former, a runtime viewer or engine is typically downloaded in cooperation with a wrap descriptor when the corresponding wrap is requested and is to be rendered on the client device. In the case of the latter, the runtime viewer or engine is included in the native app.

During consumption of a wrap on a client without a native app, the runtime viewer on the consuming device initially generates an object graph from the wrap descriptor and then subsequently generates a Document Object Model ("DOM") from the object graph. The runtime viewer then cooperates with the browser on the device to generate a runtime instance of the wrap based on the DOM. This two-step approach differs from how conventional web pages are usually processed and displayed. Typically, the browser on a consuming device will convert Hyper Text Markup Language (HTML) defining a web page into a DOM, which is then used by the browser to directly display the web page. There is no intermediate transformation step of converting a "raw" wrap descriptor into an object graph prior to the browser displaying content based on a DOM. With consumption of a wrap on a client device with a native app, the runtime instance is generated or derived directly from the object graph.

In addition, the runtime viewer creates a card list in the sequence order(s) from the wrap descriptor and provides navigation tools that operate in cooperation with the browser to facilitate transitioning between cards during consumption. In non-exclusive embodiments, the order of the cards is implicit in the descriptor structure. Since the navigation functionality is provided by the runtime viewer, the cards themselves do not have to include navigational constructs. That is, there is no need to provide explicit linking or navigation components in the cards to facilitate normal navigation between adjacent cards in the wrap, which helps simplify card design. Since normal navigation is handled by the runtime viewer in cooperation with the browser, the cards only require navigational constructs when the author desires to override the standard wrap navigational features. This allows wrap authors to concentrate on creating the desired content and visual appearance of their wraps, without needing to worry about the platform dependent formatting or navigation requirements. In other embodiments, however, cards may include navigational constructs that operate either in place of or in cooperation with the navigation tools provided by the runtime viewer.

The navigation tools that are actually used for any particular wrap instance can be device and/or platform dependent. For example, swipe navigation is preferably facilitated when the consuming device has a touch sensitive screen, as is popular in most mobile computing devices such as smartphones and tablet computers. Selectable GUI navigation buttons (such as arrows, buttons, text-based swipe directions, etc.) may also be displayed on the screen to facilitate navigation between cards. In addition, non-touch screen based navigation may be facilitated when the consuming device has as a selection device (e.g., a mouse) and/or a keyboard or keypad where various keys (e.g., right, left, up and down arrow keys, etc.) may be used to navigate between cards.

In a non-exclusive embodiment, wrap packages are a mobile-first marketing and commerce platform that ideally provides a beautiful world of storytelling in bite-size moments that get and hold attention. In other embodiments, wrap packages can be used and distributed to other platforms, such a desktop computers or Smart TVs for example. Wrap packages, although highly suitable for mobile, are not limited only to mobile devices.

Wrap packages takes content combined with mobile app and website functionality and makes them into an elegant card-based narrative that is delivered in the browser as a sharable and savable message. Wrap packages thus provides an app-like user experience that is delivered as a live, interactive message from a cloud-based platform, using for example, the Software as a Service (SaaS) model.

The uniqueness of wrap packages creates opportunities for business and other organizations alike to innovate and improve marketing efforts, customer support, and user experiences in ways previously not possible, because an enabling interface and platform did not exist. Wrap packages can thus potentially define the next generation interactive web paradigm, particularly for mobile, although for desktop and other types of devices as well.

By authoring wrap packages, businesses and other organizations can simply and cheaply create, distribute, and manage storytelling mobile web user experiences, app like functionality, all in the context of wrap packages delivered directly to consumers. Where businesses used to have to build destinations (websites) or use monolithic systems (apps), they can now provide consumers, particularly mobile device users, with a user experience that delivers the content they want combined with a complementary palette of functions and/or e-commerce related services.

While wrap packages can advantageously be used by businesses, they are by no means limited to just commercial applications. On the contrary, wrap packages can also be used as a form of social media. For example, wraps can be used by individuals to share media and experiences that capture moments and sentiments that can be conveyed in a storybook or magazine like format and that can be readily shared with friends, family members and colleagues.

Wrap packages are also platform and device independent. Wraps do not have to be written for any specific platform, such as iOS or Android, or for any specific device or class of devices (e.g. smart phones, tablets, desktops, etc.). On the contrary, a wrap package need be authored once and it will run on almost any device, regardless of the operating system or the type. This ubiquity, along with the ability to easily distribute wrap packages similar to messages, is a powerful construct that potentially can make the use of wrap packages near universal.

Wrap packages thus solves a number of current problem with the mobile web. Unlike web sites, wrap packages are easy to consume on mobile devices and offer the opportunity to create compelling narratives and user experiences. In addition, the ability to incorporate app-like functionality into wraps provides a multi-function app-like experience, without having to be in an app, download an app, or open several apps.

A wrap is a portable container of multimedia content, such as text, images, photos, audio, video and the like, and interactive services designed for ease of delivery, exchange, and consumption. It is comprised of a collection of cards, which, from an end-user/consumer perspective, are atomic units of the aforementioned multimedia content and interactive services.

The cards in a wrap have an explicit sequence so that, when taken as a whole, they are ideal for, but not necessarily limited to, creating a narrative story as the cards are browsed in the defined sequence. The multimedia content and/or interactive services contained by any given card can be determined entirely in advance or as late as the moment the wrap is consumed by the end-user.

Cards have a visual representation intended to evoke similarities to their physical counterparts. They have a fixed portrait aspect ratio that makes them ideally suited to current mobile computing devices as well as easy to scale up to and arrange to fit other display form factors, such as provided on laptop and desktop computers as well as smart TVs. The physical card metaphor can also extend to the interactive behavior of cards in a wrap, as the user can use gestures that evoke the "flipping" of cards in a deck or bound booklet to navigate between them.

Cards, however, however can differ from their physical counter-parts in ways that provide for unique presentations of content or the aforementioned interactive services. For example, a gallery card provides the ability to present an expanded amount of content in a vertically stacked orientation such that the overall length (i.e., the number of cards in a horizontal sequence) of the wrap is not affected by the amount of content in the wrap. This aids in navigation since the user can flip to the previous or next card regardless of their current position in the gallery.

The cards of a wrap may include app-like functionality and/or interactive features, such as for example, the ability to purchase goods and/or services, make an appointment, reservation or booking for goods and/or services, the ability to conduct an online chats, GPS or location services, the ability to enter approvals and/or data, can all be incorporated in or other included in the experience when consuming a wrap package.

Such app-like functionality can be incorporated or included in a wrap using any of a number of different embodiments. For example, such functionality can be directly embedded in one or more cards of the wrap. Alternatively, cards with widget components can be used. In this embodiment, a widget descriptor associated with the widget card would define a remote widget server and the calls necessary to exchange data needed to present the app-like functionality within the widget card. In yet other embodiments, one or more card(s) may include links to allow "cul-de-sacing" to either a remote location such as a web site or dependent cards in the wrap package that are not necessary next in sequence order. In either case, either the remote web site or the dependent cards are used to implement or provide the app-like functionality. When the user interaction is complete, control is returned to the originating card, meaning the viewer has completed a "cul-de-sac" while consuming the wrap. These are just a few illustrative examples of the app-like functionality and interactivity that can be built into the cards of wrap packages.

The wrap package data structure definition, or schema, contains a unique identifier and descriptive metadata for the wrap and contains a card package for each card in the wrap. Similar to the wrap package, the card package is an abstract, platform-independent data structure representing the contents of a card, which is a composition of components representing internal atomic units of content such as text or an image or other nested containers of components. Components may also represent content that is dynamically generated at the time of consumption, for example, by fetching content from the Internet or by processing input from the user.

Cards are thus like containers for holding and distributing media content, such as text, images, photos, audio, video and the like. In addition, cards may also contain or hold executable objects that provide or enable real-time features, such as application functionality (i.e., the ability to schedule appointments, engage in online chats or conversations) and support e-commerce related services (i.e., the ability to purchase goods and/or services). Such media content and executable objects are sometimes referred to herein as card "assets." Cards are also consumable anywhere, meaning they have the ability to be resolved and displayed on just about any type of device (mobile phones, laptops, tablets, wearable computing devices such as smart watches, desktop computers, smart TVs, etc.), regardless of the platform (e.g., iOS, Android, Microsoft, etc.). In addition, cards are a navigation metaphor. Each card can be authored to group related information that can be easily consumed within a user interface experience by swipe (or other simple gesture) navigation from card-to-card. Wrap packages thus represent a holistic, book like, narrative approach to presenting information and providing application and/or e-commerce related services to users and consumers, particularly those using mobile devices, such as smart phones and tablet computers.

In addition, each card in a wrap has defined content that is displayed in a predefined layout. In general, the cards in a wrap have the same size and aspect ratio. The aspect ratio is preferably device independent and is preferably maintained regardless of device orientation and/or display window size.

The cards of the wrap packages are ideally authored in one or more linear sequences so that a book-like or magazine-like narrative unfolds, not only through the cards themselves, but also by the transition between the cards, as they are sequentially browsed. In addition, the wrap packages are portable objects that may exist within a social data feed or within a custom application. Wrap packages are also readily distributed, similar to electronic messages, through e-mail, messaging, social-media, or via a variety of other electronic communication platforms. As a result, wrap packages are consumable, sharable and savable objects. As the cards are browsed in the one or more linear sequences during consumption, the user experiences the unfolding of the authored narrative, including the defined media content interwoven with the complementary application functionality and/or e-commerce related services. As a result, the entire user experience including any application functionality and/or e-commerce related services is substantially contained within the context of the wrap package itself, often (but not necessarily) without the need to navigate to other sites.

Referring to FIG. 1, a diagram of a non-exclusive embodiment of a wrap package 10 viewable on a computing device 12 is illustrated. The wrap package 10 includes a plurality of cards 14 that are threaded together so as to enable browsing by swiping in one or more linear sequences. Any of the cards 14 may optionally include various types of media, such as text, images or photos, audio, video, a live or streaming feed of media, 3-D objects, or content from other wrap packages (not illustrated). Any of the cards 14 may also optionally provide application functionality, such as the ability to receive input data or display dynamically generated data, a calendar for scheduling or booking appointments or making reservations for goods and/or services, location/GPS, etc. In addition, any of the cards 14 may optionally provide or support e-commerce services, such as the ability to browse products in a catalog, communicate with an online sales representative, and/or purchase product(s).

By way of example, in the schematically illustrated wrap package 10, card $14_A$ includes text, card $14_B$ presents a gallery, card $14_C$ includes images or pictures, card $14_D$ includes a video, card $14_E$ includes e-commerce related service(s), card $14_F$ includes a calendar function for scheduling appointments and/or booking reservations, card $14_G$ includes a user approval function, $14_{n-1}$ includes a data entry function, card $14_N$ includes location or GPS services, etc.

On computing devices with touch sensitive screens, the cards 14 of wrap packages 10 can be navigated linearly by swiping or by using other suitable interfaces, such as a stylus or pen. In devices without a touch sensitive screen, alternative user interfaces are provided to facilitate transition (e.g., flipping) from one card to the next. In the context of the present application, the terms "swipe-browsing" or "swiping" is intended to mean the navigation from one card to an adjacent next card. With devices with touch sensitive screens, swipe browsing is typically implemented by the sliding of a finger or other input device across the display. With devices without touch-sensitive screens, other navigation tools such as a mouse, keyboard or remote control, can be used for swipe browsing. When a swipe is performed, the content of the next card in the sequence is displayed. For example, by swiping either right to left or vice versa, the next card, depending on the swipe direction, in the horizontal sequence is displayed. Similarly, by swiping up and/or down, the next card in either the up or down sequence is displayed. Thus, the user experience when consuming a wrap package is the wrap package itself (as opposed to a remote web site for example), viewable via a swipe-able interface.

Additionally, some cards may also include one or more embedded link(s) that, when selected, enable navigation to either a non-adjacent card not in linear sequence or to another wrap package, a web page or some other location entirely outside of the wrap package.

It should be noted that the particular layout of cards 14 in the wrap package 10 illustrated in FIG. 1 is merely illustrative. Both the number of rows and/or columns, and the number of sequential cards 14 within any given row or column, may vary widely as appropriate to deliver the desired user experience, narrative, content, functionality and services of the wrap package 10.

With gallery cards, such as card 14$_B$ of FIG. 1, swiping allows for the scrolling through of the contents of a card 14, which are typically too voluminous to be displayed within the size of a fixed screen display, such as that provided on a mobile phone. In an illustrative example, a particular wrap package 10 may include a plurality of cards organized in a horizontal sequence. By swiping right to left or vice versa, the next card 14 or the previous card 14 in the horizontal sequence is displayed. In the vertical direction, however, one or more selected cards 14$_B$ may be configured in the gallery format, allowing the viewer to scroll up or down by swiping through media content of the gallery. In an illustrative but non-exclusive example, a wrap package 10 authored and distributed by a car rental business may include a horizontal sequence of cards 10, each dedicated to a category of information pertinent to a traveler (i.e., cards dedicated to local hotels, restaurants, local tourist attractions respectively). By swiping up or down for a given card, relevant material within each category is displayed in a gallery format. For instance, by swiping up or down the hotel card (not illustrated), a gallery of a number of local hotels is displayed. In variations of the gallery card format, the behavior invoked by an up or down swipe may differ. For example, swiping up or down my result in a continuous "rolling" of the content of the gallery card. In other embodiments, an up or down swipe may result in a "snap" action with the next item of content appearing after the snap, for example, as illustrated as cards 14Y and 14Z in FIG. 1.

The wrap package 10 is identified, as described in more detail below, through the use of a unique identifier (see FIG. 3A, wrap ID 42) assigned to the package 10. By way of example, the wrap ID 42 may take the form of a Uniform Resource Identifier (URL). As such, the wrap ID may thus be provided as a link, which can readily be used to effectively send or retrieve the wrap package. That is, the wrap package may effectively be "sent" to a potential viewer as a link using any of the wide variety of mechanism that can currently—or in the future—be used to send a link or convey the URL. By way of example, this may include e-mail messages, text messages, SMS messages, via a Twitter tweet, as a post on social media such as Facebook, etc., discussion forums, walls or the like, as a link embedded in a document, an image, or a web page or any other media type, in a blog or microblog (e.g. Tumblr), or any other messaging or electronic content distribution mechanism or communication platform currently known or developed in the future.

Wrap packages are therefore significantly different and more powerful than web sites. For example, with wrap packages, they can be consumed "on the spot" where it is located (i.e., when delivered to a mobile device for example). In contrast with the selection of a banner ad appearing within a web site, where the viewer is taken to a new web page that is not (a) necessarily designed for mobile devices and (b) is self navigating, making it very difficult for a narrative to be conveyed. As a result, the user experience, particularly on mobile devices, may be very poor. Hence, the friction of providing a compelling user experience with wrap packages is far less than with web site.

The cards 14 of a wrap 10 can be displayed on the screen of virtually any type of computing device. It should be appreciated that the card metaphor is particularly well suited for use on mobile devices such as smart phones, tablet computers, etc., which makes the format particularly powerful for authors interested in developing content tailored for mobile devices. By delivering wrap packages 10 to mobile devices, users and potential customers can be won over at their point of intimacy, where they spend their time and consciousness. Wrap packages thus allow authors, merchants and other content providers to create compelling narratives and provide ongoing application functionality and/or e-commerce support directly delivered anytime and anywhere to users, transforming their mobile devices into a powerful business tool that enhances mobile engagement and relationships. As a result, higher customer satisfaction, better brand engagement, and a higher conversion (i.e., click-through rates) and repeat e-commerce related activity compared to other forms of after sale promotions and merchandising will likely result.

Authoring and Distribution of Wrap Packages

Figure 2:
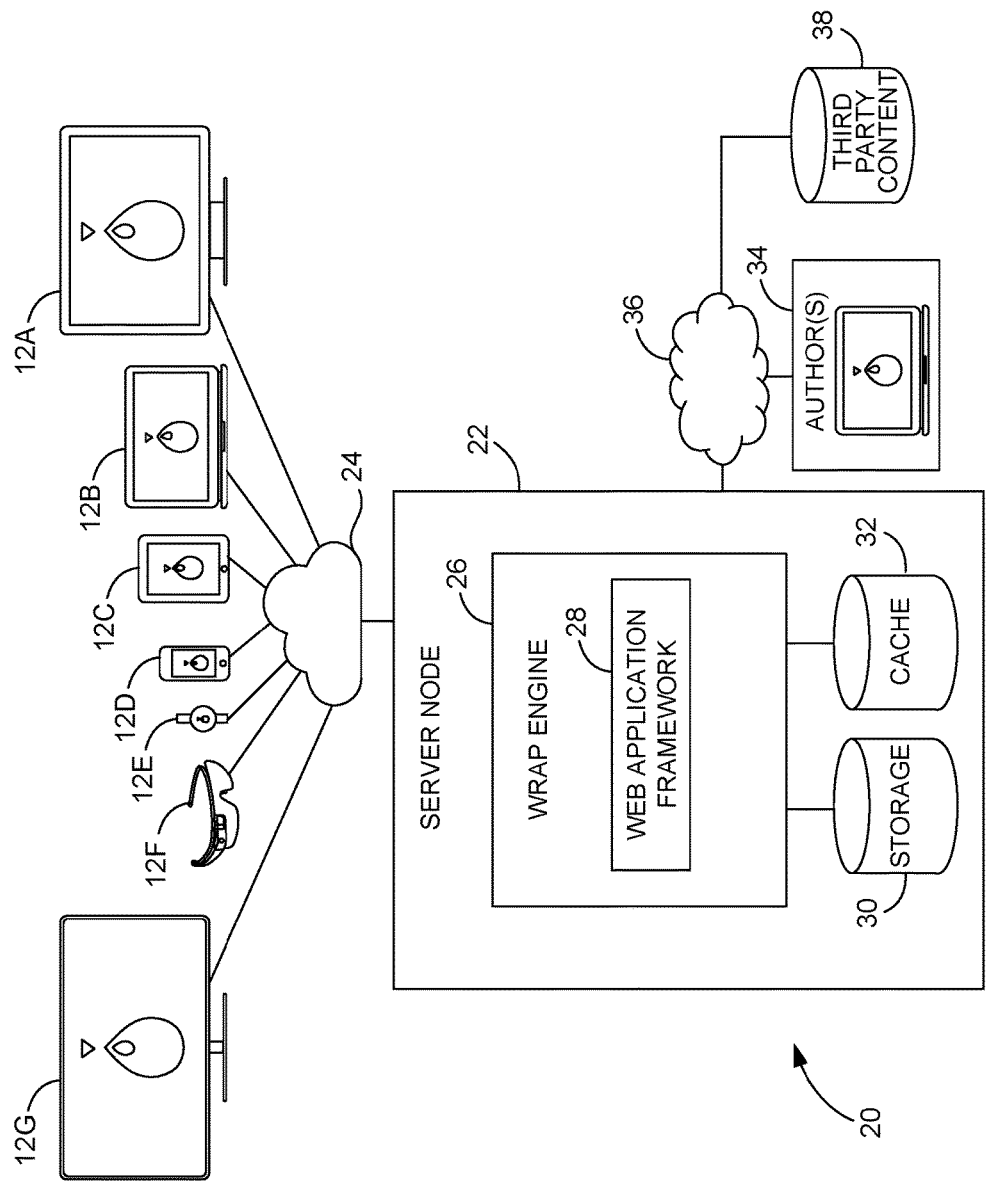
FIG. 2 is a block diagram of a representative system for authoring, storing, distributing, and consuming wrap packages in accordance with the principles of the present invention.

Referring to FIG. 2, a block diagram of a non-exclusive system for authoring, storing, distributing and consuming wrap packages 10 is illustrated. The system 20 includes a server node 22, a plurality of computing devices 12, including but not limited to a desktop computer 12A, a laptop computer 12B, a tablet computer 12C, a mobile "smart" phone 12D, a wearable computing device, such as a smart watch 12E or smart glasses 12F and "smart" TVs 12G. The server node 22 and the computing devices 12A-12G communicate with one another over a network 24. In various embodiments, the network 24 may be the Internet, an intranet, a wired or wireless network, a Wi-Fi network, a cellular network, other types of communication networks, or any combination thereof.

The server node 22 includes a "wrap" engine 26, which defines a web application framework 28, a storage device 30 and cache 32, each for storing wrap packages 10 and other data. The server node 22 also may include a suite of tools, such as an authoring tool, an analytic engine tool, a media collaboration tool and a data transformation tool, for authoring wrap packages 10. Suitable authoring tools are described, for example, in U.S. patent application Ser. Nos. 14/740,533 and 14/740,539, each filed Jun. 16, 2015, both of which are incorporated herein by reference.

The web application framework 28 is a software platform designed to support the manual and/or automated authoring of wrap packages 10. The framework 28 is designed to alleviate the overhead associated with common activities performed during the authoring of many wrap packages 10. For example, the framework 28 may include one or more libraries to help with the authoring of common tasks, and modularizes and promotes the reuse of code designed to perform specific tasks, such as implementing application functionality and/or supporting e-commerce. In various embodiments, the web application framework 28 may be implemented using, but is not limited to, Ruby, Rails, JavaScript, Angular-JS, and/or any other language or framework currently known or developed and used in the future.

In a non-exclusive embodiment, the web application framework 28 of the wrap engine 26 also performs content management as a way of organizing, categorizing, and structuring the media and other content resources such as text, images, documents, audio files, video files and modularized software code so that the content of wrap packages 10 can be stored, published, reused and edited with ease and flexibility. The content management function is also used to collect, manage, and publish content, storing it either as components or whole documents, while maintaining dynamic links between the components and/or cards 14 of a wrap package 10.

In yet another non-exclusive embodiment, the web application framework 28 of the wrap engine 26 is structured around multiple tiers, including but not limited to a client tier, an application tier and a database tier. The client tier refers to the browser enabled communication devices 12 that execute and display cards 14 of wrap packages 10, as well as web pages written in HTML or another mark-up language. The database tier, which is maintained in storage 30, contains the one or more libraries of user and/or platform provided media content, software components, modules, etc. used for the authoring of wrap packages 10. The application tier contains the software that runs on the server node 22 and that retrieves and serves the appropriate wrap package 10 from storage 30 and/or cache 32 when requested by a computing device 12.

Since wrap packages 10 are essentially data objects, they can be both cached and delivered over a Content Delivery Network Interconnection (CDN), both of which can be effectively used to deliver wrap packages 10 with minimal delay. For example, commonly requested wrap packages 10 may be cached in the cache 32, which provides faster access and delivery times than storage 30. Also other caching techniques, such as pre-caching, may be used with popular wrap packages 10, to speed up delivery times. Since the amount of storage in the cache is typically limited, cached wrap packages 10 and other data may be periodically replaced by any known replacement algorithm, such as first-in, first-out or least recently used for example.

During the composing of a wrap package 10, one or more author(s) 34 may access the server node 22 over a network 36, which may be different or the same as network 24. The author(s) 36 interact with the wrap engine 26, including the web application framework 28, and the above-mentioned suite of tools for the creation, editing, optimization and storing of wrap packages 10. In yet other embodiments, the one or more author(s) 34 can also access third party content 38 for inclusion into a wrap package 10. As previously noted, wrap packages 10 can be authored manually by one or more individuals or electronically in an automated process.

For more details on the authoring of cards 14 of wrap packages, see U.S. provisional applications 62/062,056 and 62/062,061, both entitled "Wrapped Packages of Cards for Conveying a Narrative With Media Content, Providing Application Functionality, and Engaging Users in E-commerce", both filed Oct. 9, 2014, and both incorporated by reference herein for all purposes.

Once the authoring of a wrap package 10 is complete, it is maintained in storage 30 and possibly cached in cache 32. In response to receiving an identifier, the wrap engine 26 fetches the corresponding wrap package 10 from storage 30 or the cache 32 and serves it to the requesting computing device 12 for consumption in a format customized for the viewing device.

Figure 4:
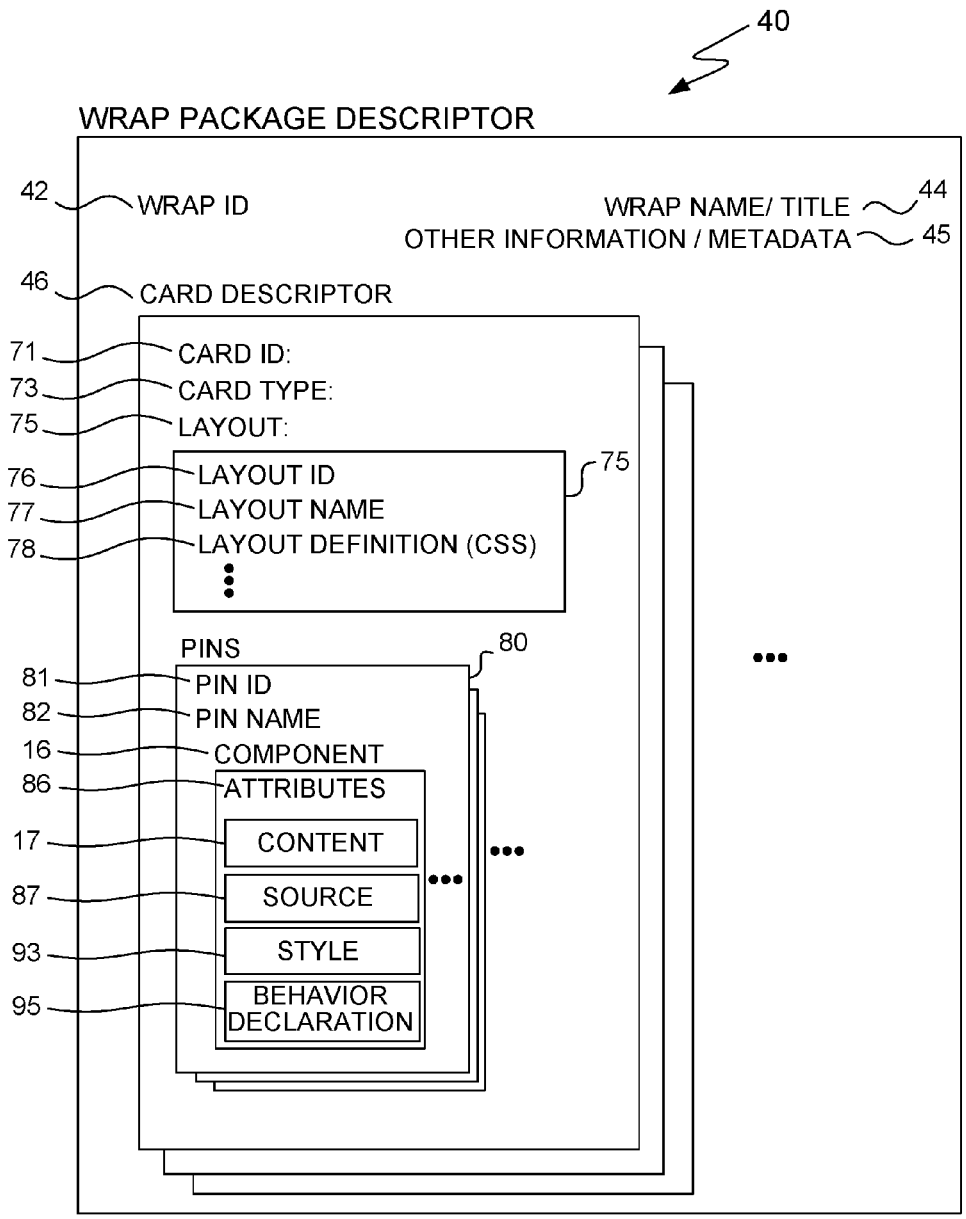
FIG. 4 is a diagram illustrating the hierarchy of a wrap package descriptor in accordance with the principles of the present invention.

It should be noted that the authoring and distribution diagram of FIG. 4 is merely representative and should not be construed as limiting. For example, multiple server nodes 22 for the authoring and/or distribution of wrap packages 10 may be provided at the same or different locations. In addition, multiple instantiations of a given wrap package 10 can be stored at multiple server nodes 22, typically located at different geographic locations. With this arrangement, the server node 22 that is most capable of quickly delivering a requested wrap package 10, sometimes referred to as the "publication server", is the node 22 that will deliver the wrap package to the requesting device 12.

The Wrap Package

Figure 3A:
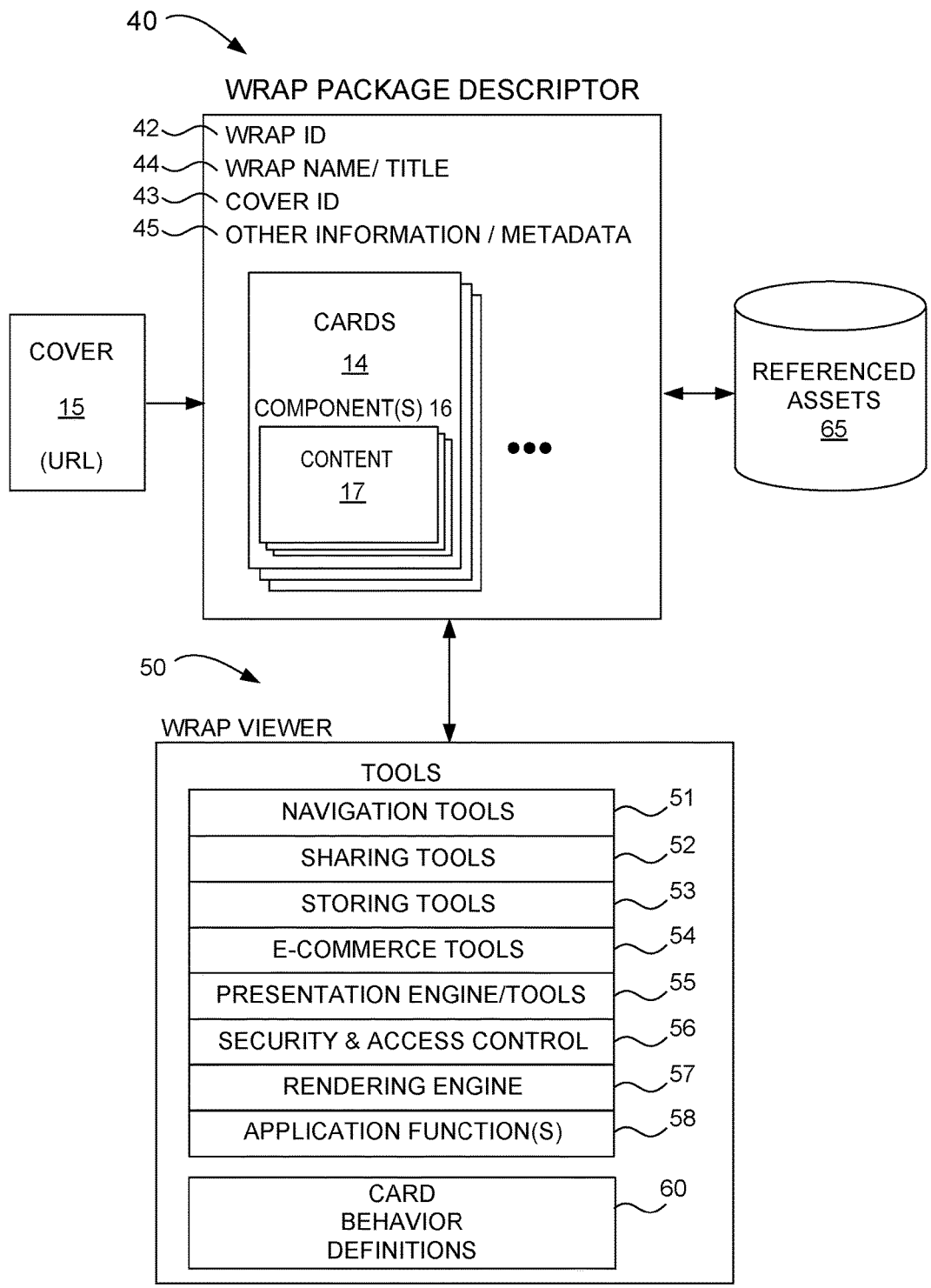
FIG. 3A diagrammatically illustrates selected components associated with defining and rendering a representative wrap package.

As diagrammatically illustrated in FIG. 3A, a wrap package 10 includes a set of one or more cards 14. Each card 14 may contain one or more components 16 that serve as containers for content objects 17. The content objects 17, together with the behaviors associated with the cards and components 16, define the content and functionality of the cards. The content objects 17 may be simple or complex. Simple content objects 17 include standard web-based content types such as text, images, video clips, etc. More complex content objects 17 may include objects having more complicated structures and/or behaviors, as will be described in more detail below.

The structure of the wrap 10, including the structure, layout and components 16 of each of its cards 14 is preferably defined by a wrap descriptor 40. The actual structure of the descriptor 40 may vary widely and a few different suitable descriptor structures are described in more detail below with respect to FIGS. 6-6D. Some content objects 17, such as text, may be directly included (in-line) in the component 16. Other content objects 17, such as images or video clips, may be included by reference, e.g., through simple URL references, or in-line through an encoding method such as MIME (Multi-Purpose Internet Mail Extensions). Complex content objects 17 may be specified in-line or by reference and may (a) contain other components 16 or content objects 17 and/or (b) specify abstract behaviors.

Referenced content objects 17 stored outside of the wrap descriptor 40 are sometimes referred to herein as assets 65. The referenced assets 65 may take the form of almost any type of content that can be included in the wrap package. This can include text, photos, images, 3-D objects, audio, video, and other media content or streams and/or a variety of executable objects, services and/or other functionality. Sometimes an asset may take the form of a stream and the wrap descriptor 40 is arranged to identify the source of the stream (i.e., the feed). By way of example, the stream could be a live audio or video stream, a data feed such as a stock ticker, sensor outputs, biometric information, etc.

In certain circumstances, some or all of the assets 65 associated with a wrap 10 may be stored and accessible from a dedicated wrap server. However, that is not a requirement. Rather, an asset can be retrieved from any location that would be accessible by the consuming device (e.g., through the Internet, an intranet or private network or any other reliable means), and there is no need for the various assets 65 to be located in a single asset store, although that may be desirable in many circumstances.

The wrap package 10 has an associated identifier, the wrap ID 42, that uniquely identifies the wrap 10. The wrap ID is preferably a globally unique identifier (GUID). In some embodiments, the wrap ID 42 takes the form of a URL, or any other identifier that can be converted to, or extracted from, a URL, which facilitates access to the wrap 10 over the Internet using conventional mechanisms. An example of a conversion of the wrap ID to a URL might be adding a domain as a prefix to the wrap ID to form a URL (e.g., www.wrap.com/wrap/<wrapID>).

FIG. 3A also diagrammatically illustrates selected components associated with defining and rendering a representative wrap package 10. The illustrated components may optionally include one or more covers 15, a wrap descriptor 40, a wrap runtime viewer 50 and various referenced external assets 65. As previously noted, the wrap descriptor 40 defines the structure, layout and components 16 of each of the cards 14 within the wrap package 10. The wrap descriptor 40 typically includes the wrap ID 42 and a set, deck or array of card definitions or card descriptors 46, each defining the structure of an associated card (as described with respect to FIG. 6 for example). The wrap descriptor 40 may also include other information of interest such as a wrap name/title 44 and optionally one or more cover identifier(s) 43 and/or other information or metadata 45 about the wrap package 10.

To facilitate rendering the wrap package 10 on various different devices, the wrap is preferably stored in a data format that separates the data from the presentation. In a non-exclusive embodiment, a component based descriptor format is used in which attributes (e.g., styles etc.—which may take the form of CSS) and behaviors may be may be applied at any defined component level (e.g., the wrap, card, or component levels, but not to individual elements (non-components) within a given component. For example, a textbox component may include an extended string of text. Any special formatting desired for the component is preferably associated with the textbox component and thus the entire text string. No explicit mechanism is provided for associating unique styling (e.g., tags, CSS, etc.) with any subset of the words within the text string. This constraint on the use of attributes provides less flexibility than standard mark-up language usages, but helps separate the content from the presentation and helps simplify the descriptor structure and the descriptor serialization and deserialization processes. As previously discussed, attributes may be associated with components at any desired level including to the entire wrap (the wrap level), to an entire card (the card level), or at the component level. The ability to simply and efficiently associate attributes with components at any defined component level, and only at the defined levels, is provided within this descriptor framework. As a result, the card creation and rendering processes is significantly simplified, while still supporting the ability for authors to create visually compelling creative content.

Wrap descriptors can be represented in a number of different formats. For instance, a wrap descriptor may be formatted using markup languages, such as XML, which are common formats used for the distribution of web content and functionality. Although markup languages can be used to represent a wrap, the Applicant has found that using a JavaScript Object Notation (JSON) format for representing wrap descriptors works particularly well for defining a wrap package of cards. As explained in detail below, the use of JSON results in wrap descriptors that are generally more compact and concise and that are simpler to produce, transport and consume compared to using a markup language.

JSON is a lightweight, text-based, language independent data interchange format. Although JSON is a well known for exchanging data, to the best of the knowledge of the Applicant, JSON has not previously or conventionally been used to define the entire structure, layout and content of web based cards or even web pages and it has not been used to represent the structure, layout and content of a set of cards such as wrap packages as described herein. On the contrary, conventional wisdom suggests that markup languages (in conjunction with style sheets—e.g. CSS) are the most suitable medium for defining the content and presentation of web based documents, including both traditional web pages and web-based cards. However, the inventors have found that the use of descriptors in general, and the use of JSON descriptors in particular, has several advantages when representing a set of cards of a wrap package when compared to using markup language card definitions. That is, the descriptor 40 may take the form of a JSON object. In other embodiments, a BSON (Binary JSON) data object may be used. Although the use of JSON or BSON data objects is described, it should be appreciated that in other embodiments, the wrap package 10 may be stored in a variety of other suitable formats, whether now existing or later developed.

One advantage of using JSON is that in the context of defining the structure, layout and content of a set of cards, JSON tends to be more compact than XML and other popular markup languages. Another advantage of using JSON relates to portability. Since JSON is derived from JavaScript, any JavaScript parser associated with a JavaScript interpreter will likely be able to seamlessly parse JSON. Today, JavaScript interpreters are ubiquitous and included in virtually all web browsers and web based viewers, which simplifies (and reduces the size of) the runtime viewer since there is no need to include a dedicated descriptor parser. In contrast, if XML were used to create the descriptor, many runtime environments would need to be supplemented by an appropriate XML parser.

JSON's ability to express typed data, and especially arrays, also has benefits in the context of a wrap descriptor. Consider, for example, the JSON expression:

"cards":[ . . . ]

This expression communicates that the defined structure is an array of "cards". The communication of data type, especially arrays, is beneficial within the context of wrap packages because wrap descriptors may contain repeating elements where implicit order is important. In the example, the expression "cards": [ . . . ] is used to define the set of cards that constitute the wrap as can be seen, for example, in the Appendices of the U.S. provisional application No. 62/210,585 (P005P6), incorporated by reference herein in its entirety, including the Appendices. The implicit order of the array elements (i.e., the order of the cards in the array) is then used by the runtime viewer to define the order of the cards within the runtime instance of the wrap package. That is, the order of the cards in the package is implicitly defined by the wrap descriptor. In contrast, defining the order of a set of cards using traditional markup language approach, without explicit card-to-card links, is more cumbersome. Arrays are also useful in other applications within the context of wrap packages, as for example, implicitly defining the order of gallery items within a gallery, etc.

Thus, in certain non-exclusive embodiments, the definition of the wrap package 10 may be stored as a JSON data object at the server(s) 22. That is, the descriptor 40 may take the form of a JSON object. In other embodiments, a BSON (Binary JSON) data object may be used. Although the use of JSON or BSON data objects is described, it should be appreciated that in other embodiments, the wrap package 10 may be stored in a variety of other suitable formats, whether now existing or later developed.

The optional cover 15 of the wrap package 10 is typically a graphic object that contains an embedded hyperlink to the wrap (e.g., the URL used as wrap ID 42) and can be placed in any suitable type of electronic media to represent the wrap package 10. Thus, a wrap 10 may be accessed by clicking on or otherwise selecting the cover 15 or by clicking on, or otherwise selecting any other type of link containing the wrap ID 42. As such, in order to "distribute" a wrap package 10, either the cover 15 or a link can be distributed to potential viewers of the wrap package 10 using any available tool. For example, the wrap package 10 may be distributed by: (i) placing the cover 15 or a link on a webpage, in an ad or in any other location that can be accessed by a potential viewer via a browser, (ii) by posting the cover 15 or a link on a blog, a micro blog, a forum, a wall etc. or any social media distribution mechanism such as Facebook, Twitter, etc.; (iii) by including the cover 15 or a link in a message such as e-mail, SMS message, a Twitter Tweet, text messages, etc.; or (iv) using any other available distribution mechanism or platform, either known now or developed in the future. Therefore, in many circumstances, it is desirable to create a cover 15 that is attractive and entices viewers to access the associated wrap package 15. In some instances, the cover 15 may take the form of an image from the wrap package 10 itself (e.g., the first card); however, that is not a requirement.

The wrap package 10 is configured to be rendered on a consuming device 12 in conjunction with a wrap runtime viewer 50, which is also sometimes referred to as the wrap run-time engine or simply the viewer. The runtime viewer 50 provides a set of tools and functionalities that are helpful for viewing and/or interacting with the wrap. In some circumstances, the viewer 50 will take the form of a dedicated, platform specific, wrap viewer application (e.g., an applet or app in the context of a mobile device), a plug-in (e.g. a browser plug-in) or other mechanism installed on the viewing device that provides the necessary functionality. In other circumstances the wrap viewer functionality may be incorporated into other types of applications. However, limiting the rendering of wraps to devices which have preinstalled wrap viewing applications/functionality would greatly reduce their portability since users are not always motivated to install such applications unless or until they see a compelling need. Therefore, as will be explained in more detail below, the delivery of a wrap packages 10 may optionally be accompanied by a run-time viewer 50 that includes a set of associated tools and functionalities suitable for use by a conventional browser to generate and/or render the runtime instance of the wrap based on the wrap descriptor 40 and to facilitate user interaction with the wrap package 10. These tools and functionality can be thought of, and are often referred to herein as a wrap toolset that is part of the wrap runtime viewer 50. By providing the wrap construction, viewing and interaction toolset in a browser executable form together with the wrap descriptor 40, the wrap package 10 can be consumed on a wide variety of different devices and operating system platforms (e.g., iOS, Android, Microsoft, etc.) without requiring the users to download and install a device and/or platform specific viewer application. This is a powerful construct for enhancing the portability and viral distribution of wrap packages among a myriad of devices and operating system platforms In the embodiment illustrated in FIG. 3A, the viewer toolset provided with the wrap viewer 50 includes navigational tools 51, sharing tools 52, storing tool 53, various e-commerce tools 54, presentation engine/tools 55, security and access control tools 56, a rendering engine 57, and application functionality tools 58. Of course, it should be appreciated that not all of these tools are required in all implementations and that in other implementations, a variety of other tools and functionalities may be provided as well. The navigational tools 51 facilitate navigation within the wrap package 10. The sharing tools 52 provide mechanisms by which a consumer of the wrap 10 may share the wrap with others, e.g., by e-mail, by SMS message, via a social media post, etc. Storing tool 53 allows a user to persistently store the wrap and/or when applicable, the wrap state, either locally or remotely. The e-commerce tools 54 may include a variety of functionalities that can help facilitate a variety of e-commerce tasks including purchasing, making reservations, etc. Application functionality tools 58 enable "app-like" functionality within the wrap package 10, such as conducting online chats, GPS functionality, etc. Presentation engine 55 controls the presentation. In some embodiments, the presentation engine 55 may be arranged to present the wrap on the consuming device at a scale and in an aspect ratio that is at least somewhat optimized for the device.

Security and access control tools 56 provide security and access control functionality, which might include encryption functionality and user authentication services. For example, in some circumstances, the publisher of a wrap may want to limit the circulation of the wrap to specific users or groups of users. A few, nonexclusive examples of such circumstances include when the wrap is created for use as: (i) an active receipt for a purchase as described in U.S. Provisional Application Nos. 62/062,056 and 62/075,172 (both incorporated by reference herein for all purposes) and (ii) a ticket for an event as described in U.S. Provisional Application No. 62/079,500; (also incorporated by referenced herein for all purposes)(iii) an item customized for a customer such as a travel itinerary; (iv) an employee manual as described in U.S. Provisional Application No. 62/114,731 (also incorporated by reference herein for all purposes); etc. Encryption services may be desirable to protect confidential information. Of course, there are a very wide variety of other circumstances where security and/or access control/permission functionality may be desired.

With certain embodiments, the viewer 50 may optionally also include a rendering engine 57 arranged to create and/or render a runtime instance of the wrap on a consuming device 12 based on the descriptor 40. In such embodiments, the rendering engine is arranged to dynamically generate the HTML (or other markup language) use by a browser or other viewing mechanism on the device 12 to render the wrap at runtime. In some implementations, the rendering engine 57 is arranged to create an object graph based on the descriptor 40 and a document object model (DOM) based on the object graph. The browser or other suitable app or application may then use the DOM to render the wrap package 10.

Figure 3B:
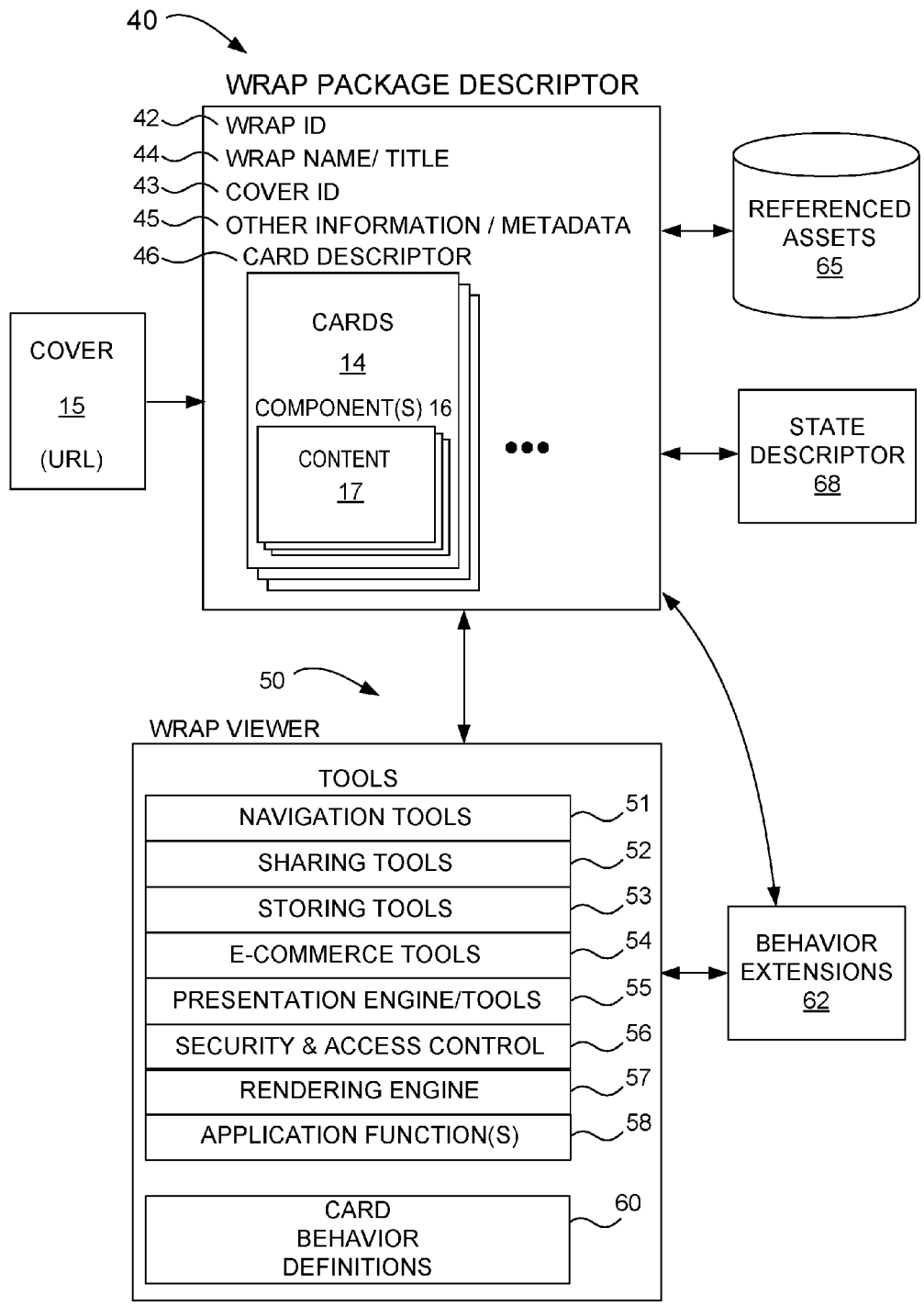
FIG. 3B diagrammatically illustrates selected components associated with defining and rendering a representative wrap package in accordance with another embodiment that uses behavior extensions.

With yet other embodiments, the viewer 50 may also optionally have any number of card behaviors definitions 60. As will be described in more detail below, different cards can be designed to exhibit a wide variety of different behaviors. In order to simplify the card, and card template creation processes, various desired behaviors can be defined separately from the cards themselves. The behaviors are known to or accessible by the wrap viewer 50 (e.g., desired behaviors may be defined through behavior definitions 60 or may be accessible as behavior extensions 62 as seen in FIG. 3B). Thus, the descriptor for any particular card or component may simply declare the desired behavior and the viewer 50 will know how to impart such behavior to the wrap/card/component and/or how to obtain an extension that imparts such behavior.

In FIG. 3A, the behavior definitions and the various tools are illustrated as separate items to facilitate their description. However, in practice, some of the illustrated tools are simply sets of associated behaviors, and therefore, the illustrated distinction between the behaviors and such tools is/are largely for emphasis.

As discussed above, the wrap package 10 may be rendered on a wide variety of different devices 12A through 12G. These devices may have a wide variety of different screen sizes, capabilities, and viewing mechanisms. When a particular device 12 requests a wrap package 10, a determination is effectively made as to whether a suitable wrap runtime viewer is already present on the requesting device. If not, a browser compatible runtime viewer 50 is provided in addition to the wrap or wrap descriptor 40. The browser compatible run-time viewer may be written in any format that is appropriate for execution by a browser. By way of example, JavaScript (JS) is a dynamic programming language that is currently popular and supported by most general purpose browsers and many other rendering mechanisms. Thus, JavaScript works well for the browser compatible viewer since the same wrap viewer can be used for a wide variety of different browsers. However, it should be apparent that in other embodiments, the wrap viewer 50 may be implemented using a wide variety of other now existing or future developed frameworks and/or languages. For example, the DOM rendering may be replaced with a React framework or another suitable framework currently known or developed in the future. When the wrap viewer is incorporated into a native application, it will sometimes be desirable to write the viewer (or portions of the viewer) in a format that executes more efficiently or is otherwise preferred for execution on the underlying operating system, etc.

Defining Card Behavior

Different cards 14 within a wrap 10 can be designed to exhibit a wide variety of different behaviors. To simplify the card authoring process, the card descriptor 46 within a wrap 10 can be arranged to declare the behavior of the card 14 without internally defining that behavior. Rather, in such circumstances, the desired card 14 behaviors are defined within the wrap viewer 50 as part of the behavior definitions 60 or through behavior extensions 62. With this arrangement, a card template designer can define the behavior for cards 14 authored using the template, or can define a set of available behaviors from which a card author can choose. If a set of behaviors are available to the card author, then the authors selects the desired behavior from the available set. In either case, the desired behavior is declared as part of the card. With this arrangement, different cards 14 within a wrap 10 can exhibit different behaviors and such behavior remains with the card even if the card is used in a different wrap. If a new card behavior is desired, the new behavior can be created and added to the behavior definitions 60. In this manner, the newly defined behavior becomes available to other template designers and/or card authors.

The card descriptor 46 for the gallery card includes a behavior declaration that identifies the desired behavior for the card, which can then be bound to the card at run-time by the wrap viewer (e.g., browser based viewer, native viewer, etc.). For example, this could take the form of a statement such as:

"Behaviors": ["vertical-snap-to-card"]

Further examples are shown in Appendix I of U.S. Provisional Application No. 62/133,574, incorporated by reference herein in its entirety, including the Appendices.

The developer of the wrap viewer 50 can define any number of card behaviors that are supported by the viewer, such as but not limited to the different scrolling techniques in the example above. Third parties can provide extensions that define still other behaviors (e.g., a scrolling behavior in which a two finger swipe reacts differently than a one finger swipe, etc.). The developer of a card template can define which of the available behaviors are available for use with the template (e.g., a subset, or all of the defined scrolling behaviors). Wrap and card authors using the template can then select which of the behaviors available to the template they would like to associate with the card, and the chosen behavior is declared as part of the card descriptor 46.

Although the specific example of scrolling behavior in a gallery card has been given, it should be appreciated that virtually any desired type of card behavior can be defined and declared in a similar manner. It should be appreciated that differences in card behavior may take a wide variety of different forms. For example, different types of cards may have different accompanying behaviors; the behavior of a particular type of card may be different based on its position within the wrap 10; and/or the animations associated with transitions may vary with respect to card position.

The actual structure of the descriptor used to define a gallery card may vary significantly. By way of a representative card descriptor structure suitable for implementing a gallery card is described in more detail below and is illustrated in FIG. 4C.

Wrap Descriptors

Figure 4A:
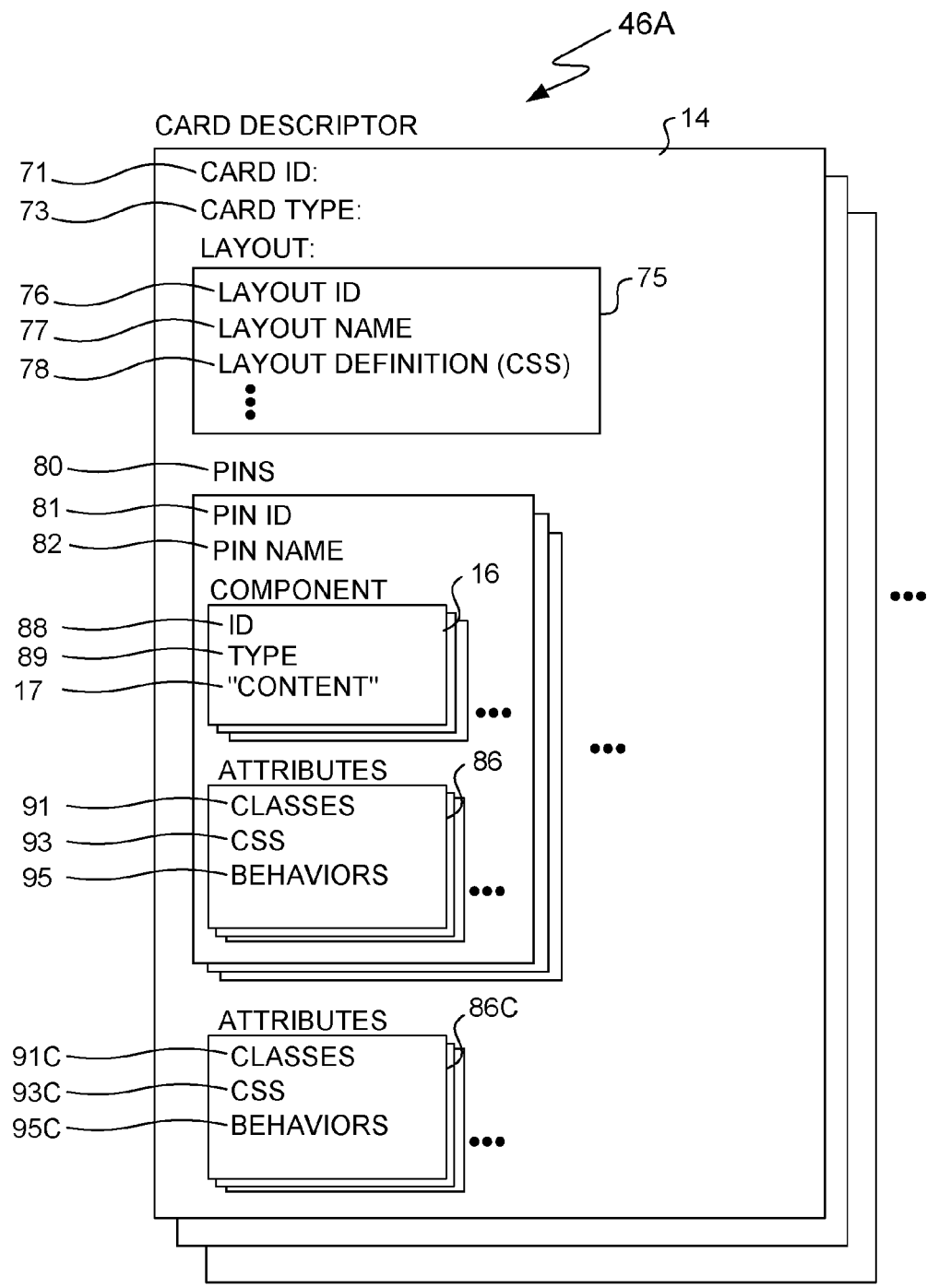
FIG. 4A is a diagram illustrating the hierarchy of a particular card descriptor in accordance with the principles of the present invention.
Figure 4B:
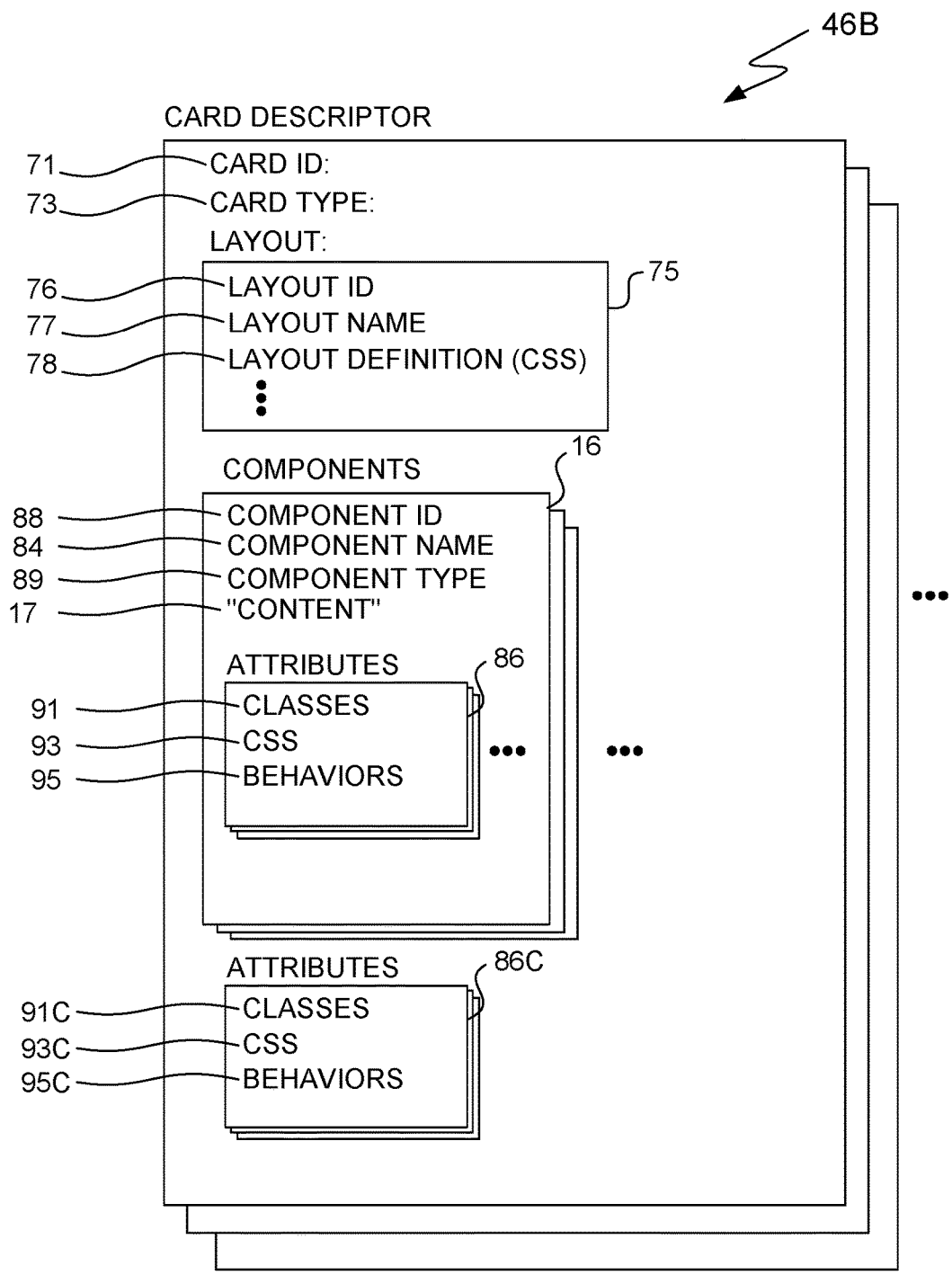
FIG. 4B is a diagram illustrating the hierarchy of a second card descriptor embodiment.
Figure 4C:
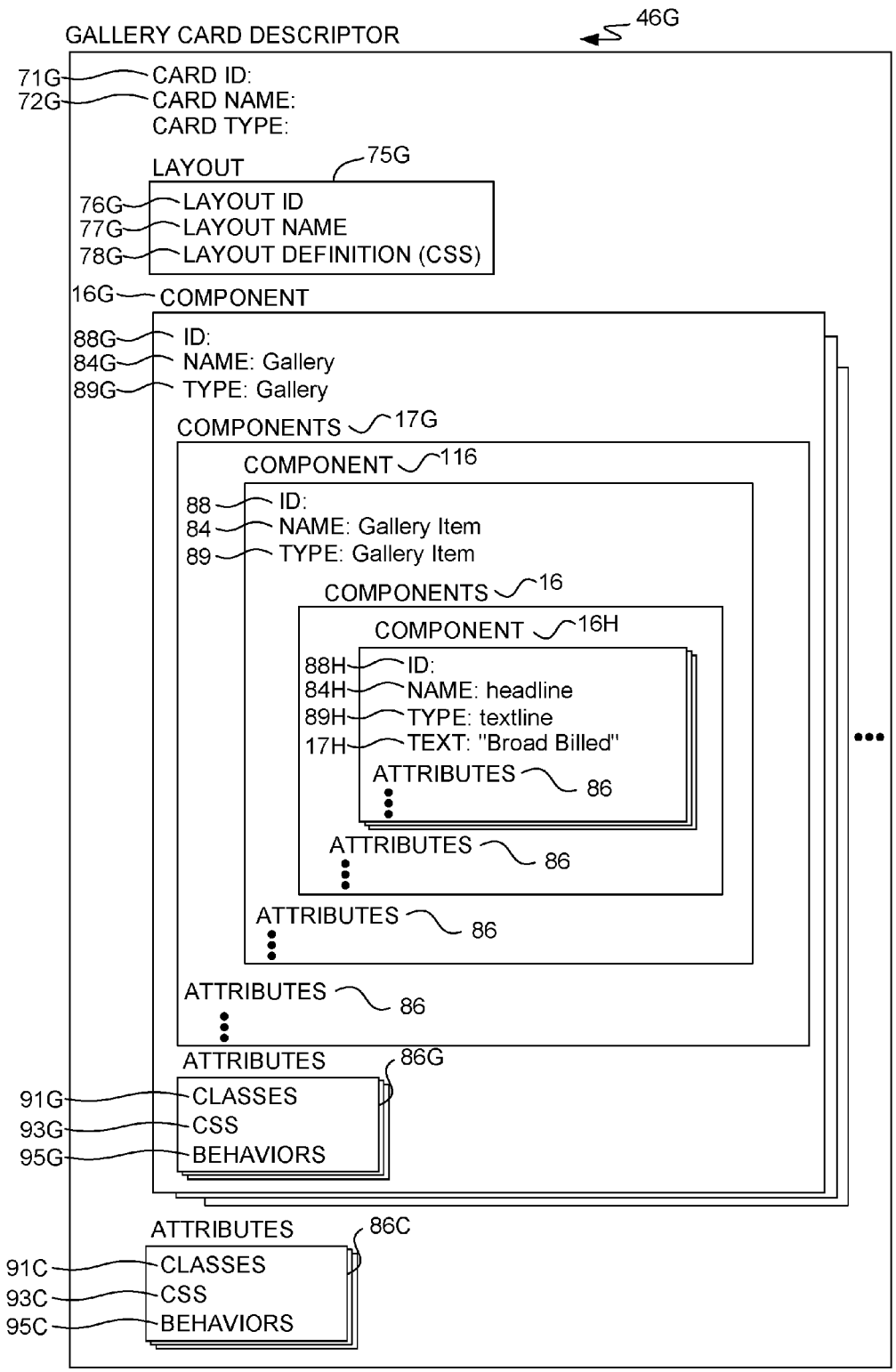
FIG. 4C is a diagram illustrating the hierarchy of a gallery card wrap descriptor embodiment.
Figure 4D:
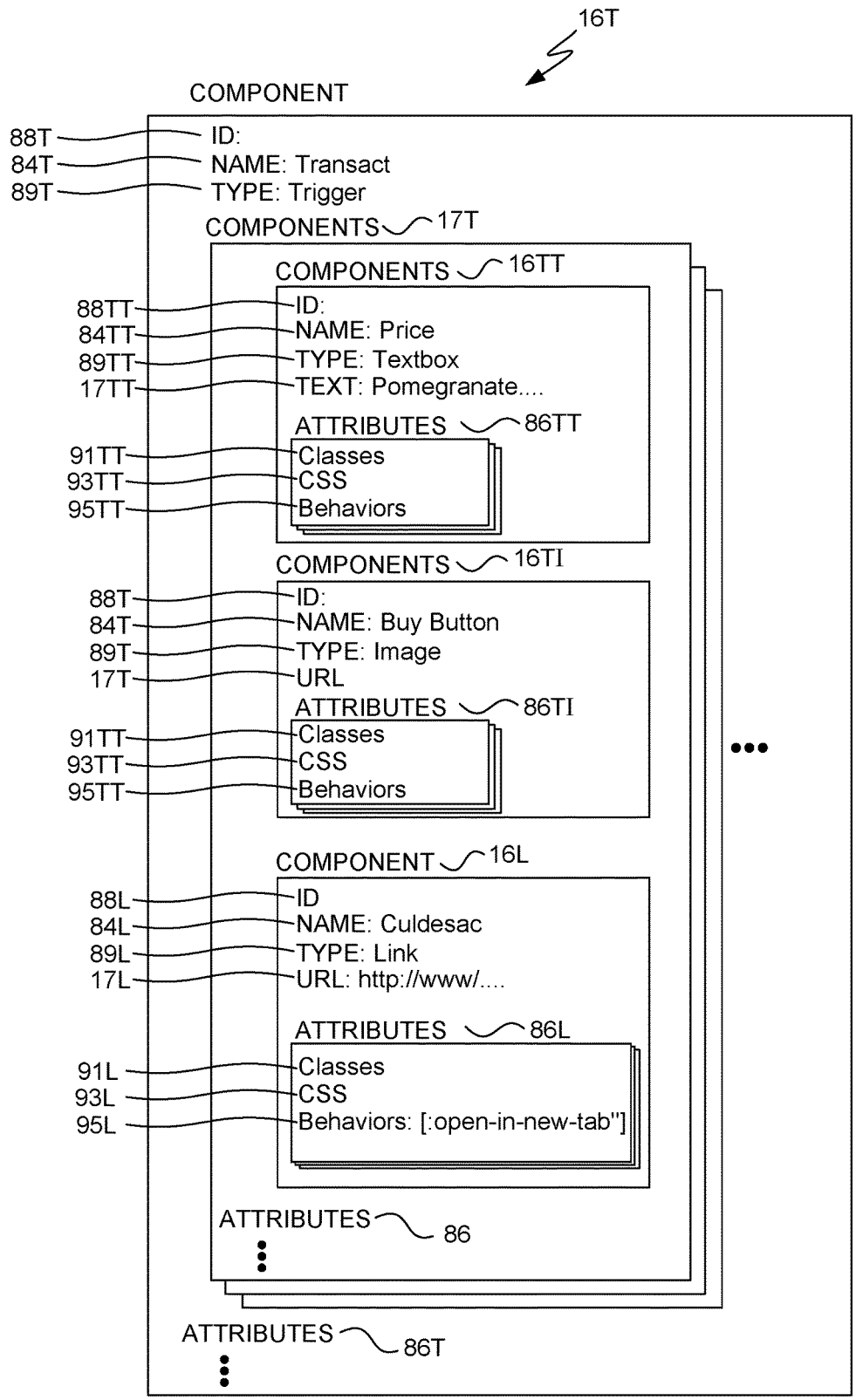
FIG. 4D is a diagram illustrating the hierarchy of a trigger component descriptor embodiment.

Referring next to FIGS. 4-4D, a variety of specific descriptor structures suitable for use in defining various wraps, cards and/or components will be described. Although specific descriptor structures are illustrated, it should be appreciated that the structure of the various descriptors can be widely varied. In general, the descriptors are arranged to define the structure, layout, content and behaviors of the wrap without details of its presentation on a particular device. That is, the descriptors capture the functional and behavioral intent of the author, in a platform independent way, such that the runtime may implement the described structures and behaviors in a way optimal for the platform in question.

A wrap generally will include multiple cards and the corresponding wrap descriptor will typically have discrete descriptors for each of the cards. The card descriptors each include a unique card identifier and define the structure, behavior, layout and content of the corresponding card. Behaviors associated with any particular card can be applied at the card level (i.e., associated with the card as a whole), at a component level (i.e., associated to a particular component alone—which may or may not include subcomponents) or at any subcomponent level. Since the card descriptors are discrete, self-contained, units with a unique identifier, it is very easy to mix wraps (i.e., use cards created for one wrap in a second wrap). When cards are mixed, their components and associated behaviors remain the same—although it is possible to define behaviors that are context or state aware and therefore exhibit different states/properties/responses/etc. in different circumstances.

The components are encapsulated units that may have defined content (although such content may be dynamic) and, when desired, specific defined behaviors, styles and/or other attributes. In some preferred embodiments, each component has a unique identifier and could optionally also have an associated type and/or name. The use of encapsulated components with unique component identifiers makes the components highly modular such that an authoring tool can readily use and reuse the same components in different cards and/or wraps. Behaviors can be associated with the component and any component can be composed of one or more subcomponents which themselves are fully defined components.

Regardless of the level to which they are applied (i.e., wrap level, card level, component level, subcomponent level, etc.), the behaviors are preferably declared in the descriptor rather than being explicitly defined within the descriptor. In that way, the behavior declaration acts as a hook which can be used to associate virtually any programmable logic with a card/component/etc. The behaviors are preferably defined (or at least obtainable) by the runtime viewer.

FIG. 4, diagrammatically illustrates the structure of a first representative wrap descriptor 40. In the illustrated embodiment, the wrap descriptor 40 includes the wrap ID 42, the wrap title 44, and a card descriptor 46 for each of the cards 14. Each card descriptor 46 describes of the structure, layout and content of the associated card. The wrap descriptor 40 may also optionally include cover identifier(s) 43 and/or any other desired information or metadata 45 relevant to the wrap. The cover identifier(s) 43 identify any cover(s) 15 associated with the wrap. Other information and metadata 45 may include any other information that is deemed relevant to the wrap, as for example, an indication of the creation date and/or version number of the wrap, attributions to the author(s) or publisher(s) of the wrap, etc.

The card descriptors 46 may be arranged in an array, deck, or in any other suitable format. In the diagrammatically illustrated embodiment, each card descriptor 46 includes: a unique card identifier (card ID 71); a card layout 75; and optionally, an associated card type 73. The card layout 75 preferably includes at least one of a layout identifier (layout ID 76) and a layout definition 78 and optionally, a layout name 77. When the layout definition is not explicitly provided in the card descriptor 46, it may be obtained by reference through the layout ID 76. The layout definition 78 may be provided in a variety of different format. By way of example, Cascading Style Sheets (CSS) works well. As will be appreciated by those familiar with the art, CSS is a style sheet language used for describing the look and formatting of a document. Of course, in alternative embodiments, other style sheets and/or other now existing or future developed constructs may be used to define the layout of the cards.

The card ID 71 is preferably a unique identifier that uniquely identifies the associated card 14. An advantage of using unique identifiers as card IDs 71 is that the cards 14 are not wed to a particular wrap package 10, but rather, can to be used in or shared among a plurality of wrap packages. That is, once a card is created it can be used in any number of different wraps by simply placing that card's descriptor 46 at the appropriate locations in the card decks of the desired wrap package. Thus, the unique card IDs 71 can be used to help streamline the process of using one or more cards 14 from one wrap package 10 in a second wrap (sometimes referred to as the "mixing" of cards 14 and/or wrap packages 10), which can help simplify the process of creating the second wrap package. In some implementations, the card IDs 71 may also take the form of URLs, although this is not a requirement. A potential advantage of using URLs as the card IDs 71 is that the URLs can potentially be used to allow a card in the middle of the wrap to be more directly accessed from outside of the wrap.

The card layout 75 defines the layout of the components 16 of the associated card 14. Preferably the card layout 75 includes a card layout ID 76 which uniquely identifies the associated layout. In some embodiments, the descriptor itself defines the layout using a conventional web presentation definition mechanism such as Cascading Style Sheets (CSS). In other embodiments, the layout definition may be accessed from a server using the layout ID 76. As will be familiar to those skilled in the art, CSS is a style sheet language used for describing the look and formatting of a document written in a markup language. CSS enables separation of document content from the document presentation, including elements such as the layout, colors and fonts. Thus, CSS is very well adapted for inclusion within the wrap descriptor 40.

It should be noted that the layout ID 76 is also useful in the context of the aforementioned authoring tool used to create and author wrap packages 10. Specifically, in some embodiments, the authoring tool is provided with a number of pre-defined templates (card layouts) from which an author of a new card can choose. Each template has one or more containers/components 16, which are arranged on the card in a predetermined manner for holding card content 17. The template itself can have any particular layout, or can be used to create a particular layout. In either case, the particular layout can be assigned a unique layout ID 76, and thereafter, be used and reused in conjunction with different cards thereby simplifying the card creation process.

The card type 73 (which is optional in the descriptor) relates primarily to such an authoring tool. For convenience, the templates may be categorized into different groups or classes. By way of example, the classes/groups may relate to their intended uses, the entity for which the templates are to be used, to the creator of the templates or any other logical grouping of templates. For example, card type 73, can be assigned to one or more predefined card templates, depending on their intended function. For instance, an authoring tool may include one or more card templates, each centric for the display of text, visual media such as photos or images, the playing of video, live or streaming media, application functionality (e.g., scheduling appointments, GPS, etc.), or supporting e-commerce (e.g., displaying products and/or services for purchases, chatting with online sales representative, etc.) respectively. Thus for each template type and class/grouping, card type ID 73 may be assigned.

With the template-based approach, the author(s) of a wrap package 10 can easily select a desired template/card layout that meets their need from a set of available templates and create a new card by readily inserting the desired content, functionality and/or services into the predefined containers. Such a template based approach can greatly simplify the authoring of cards 14 and wrap packages 10, since the author(s) need not be an expert in HTML, scripting or other typical web page language constructs required in order to create the card(s) 14 as typically required with creating conventional web pages. Rather, those details are embodied in the selected template itself, which translates to a specific layout 75, which in turn is identified by the layout ID 76. When a run-time instance of the wrap package 10 is created, layout 75 is used to format the associated card 14.

The associations between components 16 and their contained content objects 17, whether explicit in the card descriptors, or implicit and anonymous, are sometimes referred to herein as "pins" 80. When explicit, pins 80 are identified in the card descriptors 46 by a universally unique Pin ID 81, and by a symbolic pin name 82. When implicit, pins are anonymous at runtime, but may at design time be instantiated in order to provide operable constructs to the authoring tools, in which case they will share the name and ID of the component they bind and associate.

Whether implicit or explicit, these conditions are equivalent, and one representation may be trivially transformed into the other and vice versa, with no loss of meaning. The runtime, authoring environment and other tools are free to transform the object graph as they see fit, and whether the association is treated as intrinsic or extrinsic is irrelevant for the purposes of the determination of the structure of the wrap and its contents, this transformation being a matter of convenience.

The symbolic name of a pin (pin name 82) or component is both Human and Machine-Readable, for example, "Headline", "Glyph", "Body", "Image", "Video", "Cul-de-sac", or any other heading that the template designer deems appropriate. The symbolic name is used to identify its function; can be used and bound to by constraints and layouts to further constrain their display, behavior and function; and is used by the authoring tools to identify the role of the thus-associated component and map fields from one layout to another when changing the layout associated with a card. Multiple pins or components can share the same symbolic name. When they do, it implies that they serve the same role in the system, and that the same rules will apply to them.

Components 16 contain their associated content 17 and may also contain or reference zero or more attributes or constraint objects, specifying metadata to manage or modify the display of, or behavior of, that component. Constraint objects may specify abstract symbolic data used by the runtime to determine how to display or manage the object containing it, (the Constrained Object) or the behavior of that object. Examples of such abstract symbolic data are CSS class names, behavior names, or other symbolic names acted on by other objects in the system. Constraints may also contain concrete specifications to modify the display or behavior of the object, or its container or any contained objects. An example of the former is containing CSS rules applied to the content. An example of the latter is inclusion inline or by reference of JavaScript code that acts on the constrained object.

The various constraint objects may be thought of as attributes that define the style, format, behaviors, source/feed, and/or constraints associated the corresponding content 17. In the illustrated embodiment, these attributes include style attributes 86, source attributes 87 and other constraint objects such as behaviors 60, 62. Of course, other attributes of a component can be defined and declared as appropriate for the associated content.

The style attributes associate various styles with the content 17 and may take the form of style sheets (e.g. CSS) or other conventional style definition mechanisms. By way of example, if the content 17 is a text string, the style attributes 86 may include features such as the font, size, case, color, justification, etc. of the text. If the content is a glyph, the style attributes may include the color of the glyph, the size, etc.

The source attributes 87 indicate the source of the associated content 17. In some circumstances, the source attribute may simply be a reference or pointer (e.g. a URL) that identifies the location of a static content object (e.g., an image, a photo, a video, etc.). However, it should be appreciated that the content can also be dynamic. For example, the content object associated with a component of a wrap could be the current price of a particular stock. In such a case, the source attribute identifies the feed from which the current price will be retrieved when the card is rendered.

The ability to incorporate feeds into a wrap is a powerful construct that facilitates a wide variety of different functionalities including the dynamic updating of information presented in a wrap after the wrap has been rendered. In general, a feed is a structured source having content that can be dynamically updated after the wrap has been rendered. As will be appreciated by those familiar with the art, there are a wide variety of different types of feeds and different feed structures. For example, a live streaming feed may present a live stream that is progressively rendered as the stream is received. Examples of live streams include live video streams, audio streams, biometric streams, stock ticker streams, etc. Other feeds are server side event driven as is commonly used to facilitate live updates—as for example, sports score updates, stock price updates, etc. Still other feeds are polling feeds in which the wrap periodically polls a source.

The source attribute 87 may take the form a feed descriptor that defines the nature and structure of the feed as well as its feed characteristics including source location, data format(s), update semantics, etc. For example, some feeds (e.g. live feeds and live update feeds) require that a socket be opened and kept open as long as the feed is active. Polling feeds require the identification of the desired polling frequency. In other embodiments, the source attribute may include a reference to a feed object (note shown) that defines the feed.

It should be appreciated that there are a very wide variety of different types of information/content that a wrap author may desire have updated dynamically while a wrap is being displayed. These might include items that may be expected to update frequently and others that may update very slowly. By way of example, a few examples of items that may be desirable to update dynamically include sports scores, stock prices, the number of tickets still available for purchase for an event, number of units of a product that are available or simply an indication of whether a product is in our out of stock, breaking news headlines, etc. A number of services can also benefit from the ability to dynamically update content based on information that can change while a wrap is displayed such as, the user's geographic location, social networking group information (e.g. friends or peers that are nearby, online, etc.), featured information, etc. For example, a card in a wrap for a sports stadium could show the nearest concession stands, restrooms, etc. which can vary as the user roams around the stadium. Another card could show the stats of a baseball player currently at bat. A social networking card may inform a user when their friends or others sharing similar interests are nearby. A retailer may wish to run special offers that update periodically. Of course, these are just a few examples. The types of content that an author may wish dynamically update is limited only by the creativity of the author. Other constraint objects may include declarations of specific behaviors that are intended to be associated with the component 16 and/or content 17. Such behaviors may include behaviors 60, 62 known to or accessible by the runtime viewer 50 as discussed above.

FIG. 4A diagrammatically illustrates an alternative pin based card descriptor structure 46A. Appendix II of U.S. Provisional Application No. 62/133,574 (incorporated by reference) illustrates a representative wrap descriptor 40A that takes the form of a JSON object that utilizes the pin based card descriptor structure 46A illustrated in FIG. 4A. FIGS. 14A-14E illustrate the wrap defined by the wrap descriptor of Appendix II of the referenced provisional. To facilitate correlation between the Appendix and FIG. 4A, various descriptor elements are labeled with corresponding reference numbers in Appendix II of the referenced provisional.

In the embodiment of FIG. 4A, the card descriptor 46 includes a unique card ID, 71, a card name 72, card type 73 and a card layout 75. The layout 75 includes a layout ID 76, optionally a layout name 77 and an explicit layout definition 78. In the illustrated embodiment, the layout definition takes the form of style sheets (e.g., cascading style sheets (CSS)).

Although the illustrated embodiment includes both the layout ID 76 and an explicit layout definition 78, it should be appreciated that either could be eliminated from the descriptor if desired. For example, if the explicit layout definition is not part of the descriptor structure, it could be accessed through the use of the layout ID. Alternatively, when the layout definition 78 is explicitly provided, the explicit use of the layout ID 76 may be eliminated. However, it is generally preferable to explicitly provide the layout ID.

The descriptor 46A also includes an array of zero or more pins 80, with each pin 80 corresponding to a first level component 16. Each pin 80 includes a pin ID 81, a pin name 82 and an associated component 16. The component 16 includes a component ID 88, a component type 89, and the component content 17. As indicated above, the content may be provided in-line or by reference. Any desired attributes and behaviors may then be associated with the component through a set of zero or more component attributes 86 which potentially include any desired component style class declarations 91, component style sheets (CSS) 93 and component behavior declarations 95. In the illustrated embodiment, the style class declarations 91 refer and bind to CSS classes defined in the layout definition 78 that are used to define the format of the associated component 16. Numerous examples of this binding can be seen in the Appendix II of the referenced provisional. By way of example, the first pin 80(1) in Appendix II has an associated component style class declaration 91(1) that refers to and binds the font size style "font size-×1" 96 defined in layout 78 to the associated text content 17(1).

Component style sheets 93 provide an alternative component level mechanism for associating specific styles and formatting with a component 16. In general, it is expected that the card layout definition 78 will define the styles and formats associated with each component in a robust manner that is satisfactory to the card author. In such implementations, there is no need to include any component level style sheets 93, and it is expected that in many (indeed most) such card implementations, no component style sheets would be provided. Rather, the associated styles may be bound through the use of class declarations 91. However, the component style sheets 93 provide a mechanism by which the style assigned to the component by the layout definition 78 may be overwritten, which gives card authors great flexibility in defining the stylistic presentation of their content without altering the card layout definition. In other implantations, it may be desirable to define some of the style attributes at the component level rather than the card level. In such implementations more aggressive use of component level style sheet 93 would be expected. In still other embodiments, the availability of component level style sheets can be eliminated altogether. In the illustrated embodiment, style sheet are used to assign styles to the components since they are currently a popular format for associating different styles with HTML content. However, it should be appreciated that other now existing or later developed constructs can readily be used to associate styles with the content as appropriate.

Behaviors 60, 62 can be associated with a component on the component level in the same manner as the style sheets. This can be accomplished, for example, through the use of behavior declarations 95 which declare specific behaviors 60, 62 with their associated component. It should be appreciated that the ability to associate specific behaviors with specific components in a general manner provides tremendous flexibility in the card creation process that facilitates the creation of cards having an incredibly wide range of functionality and behaviors while maintaining a simple, compact, and highly portable wrap structure. Even though there is an ability to associate behaviors with specific components, it is expected that the behavior set may be null for many components because they would have no need to have any specific behaviors associated therewith.

The card descriptor 46A also associates any desired card level attributes and/or behaviors with the card through a set of zero or more attributes 86C that are associated with the card at the card level. Like the component attributes 86, the card attributes 86C potentially include any desired card level style class declarations 91C, card level style sheets 93C and/or card level behavior declarations 95C which work in substantially the same way as the component attributes, except that they operate at the card level. When desired, the wrap descriptor 40 can also have similar wrap level attributes 86W. Similarly, when the content of a component includes one or more subcomponent(s), the various subcomponent(s) may have their own associated component attributes 86 regardless of the tier of the component/subcomponent. Still further, when desired, attributes can be associated with groups of components.

FIG. 4B diagrammatically illustrates an alternative card descriptor structure 46B that does not utilize pins 80. The structure of card descriptor 46B is generally similar to the structure of card descriptor 46A described above with respect to FIG. 4A except for the use of pins. Therefore, the attributes (e.g., styles and behaviors) are associated with their corresponding components 16 rather than with pins 80. Like in the embodiment of FIG. 4A, the card descriptor 46B includes a card ID 71, a card name 72 and a layout 75. The layout 75 includes a layout ID 76, layout name 77 and layout definition 78. The descriptor then includes an array of zero to many components 16.

Each component 16 includes a component ID 88, a component name 84, a component type 89, the associated content 17 and the associated attributes 86. Like in the previously described embodiment, the associated attributes may include associated classes 91, component style sheets or definitions 93, behavior declarations 95 and/or their associated behaviors 60, 62. Thus it can be seen that card descriptors 46B are functionally substantially equivalent to the card descriptors 46A described above.

Appendix III of U.S. Provisional Application No. 62/133,574 illustrates a representative wrap descriptor 40B that takes the form of a JSON object that utilizes the component based card descriptor structure 46B illustrated in FIG. 4B. To facilitate correlation between Appendix III and FIG. 4B, various descriptor elements are labeled with corresponding reference numbers in the Appendix. It is noted that the attributes container 86 is labeled "Styles" in the JSON code of Appendix III. The aforementioned provisional applications and Appendices are incorporated by reference herein.

Although only a few particular card descriptor structures have been described, it should be appreciated that equivalent functionality can be obtained using a wide variety of different descriptor arrangements.

Gallery Card Descriptors

FIG. 4C illustrates a representative gallery card descriptor 46G. The illustrated embodiment uses the component based descriptor approach of FIG. 4B although it should be appreciated that other card descriptor hierarchies (such as those illustrated in FIGS. 4 and 4A can be used as well. Gallery card descriptor 46G includes card ID 71G, card name 72G (in this case "Gallery Card"), and card layout 75G with layout ID 76G, layout name 77G and CSS layout definitions 78G, which together define a layout suitable for a gallery card. The initial component is gallery component 16G, which has a component ID 88G, a component name 84G, a component type 89G, gallery component content 17G, and any associated attributes 86G (including class declarations 91G, style sheets 93G and behavior declarations 95G).

In the illustrated embodiment, both the component name 84G and the component type 89G are "Gallery." The "content" of the gallery component 16G is a set of one or more gallery item components 116. Each of the gallery item components 116 typically, although not necessarily, has the same component structure previously described and can be thought of as subcomponents. This introduces a powerful feature of the described architecture. That is, the "content" of any particular component may be one or more "subcomponents". Similarly, the content of any of these "subcomponents" may also include one or more next tier components and so on, with the components at each tier having the same generic structure. Thus, each gallery item component 116 includes: a component ID 88, which may be thought of as a gallery item ID; a component name 84, a component type 89, content and any associate attributes 86 (potentially including class declarations 91, style sheets 93 and behavior declarations 95).

In the illustrated embodiment, the component name 84 and component type 89 for the gallery item 116 is "Gallery Item". The content of the gallery item 116 is a set of components (subcomponents) that make up the gallery item (that is, gallery items 116, which are subcomponents of the gallery component 16G, themselves have subcomponents which might be thought of as third tier components). Each of these gallery item components has the same structure as any other component. By way of example, the gallery item components may include a headline component 16H, and an image component 16I (shown in Appendix III of U.S. Provisional Application No. 62/133,574, incorporated by reference). Only the headline component 16H is shown illustrated in FIG. 4C, but the corresponding JSON descriptor is shown and labeled in Appendix III.

With the described structure, specific behaviors or styles can be associated with components at any level. Thus, for example, a behavior can be associated at the card level, the gallery item level, the component of a gallery item level or at any other level at which components are used. An example of a card level behavior might be the aforementioned gallery card "snap to item" behavior 40C, which can be seen in the aforementioned Appendices I, II and III. An example of a gallery item subcomponent level behavior might be a trigger as described below.

Although a particular gallery card descriptor structure has been described, it should be appreciated that equivalent functionality can be obtained using a wide variety of different descriptor arrangements.

Trigger Descriptors

Referring next to FIG. 4D, a descriptor structure for a representative trigger component will be described. Like other components, the trigger component 16T includes an optional trigger component ID 88T, a component type 89T, a component name 84T, content 17T and any associated attributes 86T (including any class declarations 91T, style sheets 93T and behavior declarations 95T). In the illustrated embodiment, the component type 89T is labeled "trigger" and the component name 84T is labeled "transact" indicating that the trigger is a transaction trigger.

The content 17T of the trigger component 16T in this illustrative example includes three subcomponents. The subcomponents include a text box 16TT, an image 16TI that takes the form of a "buy button" and a link 16L. The link 16L has an associated behavior "open-in-new-tab", which causes the browser to open the target URL in a new tab when the trigger is activated by tapping on a touch sensitive display anywhere within the region defined by the trigger or by otherwise activating the trigger. The described link trigger behavior is a good example of a component level behavior.

In the illustrated embodiment, the link component 16L is a first level component of the trigger and therefore the link is activated by tapping on (or otherwise selecting) any component within the trigger—as for example either the text box 321 or the buy button 327. If the card creator preferred to have the link activated only by selection of the buy button 327, that can readily be accomplished by making the link 327 a component of the buy button rather than a first level component of the trigger—or, by moving the text box component definition out of the trigger—as for example to the same component level as the trigger itself. Any tap or click in the bounding rectangle of the trigger, as defined by the components contained by the trigger, results in the trigger being activated.

It should be apparent that the trigger component may be included as a first tier component in the card descriptor or as a subcomponent at any level within the card descriptor hierarchy. Although a particular trigger descriptor structure is illustrated, it should be appreciated that equivalent functionality can be obtained using a variety of different descriptor arrangements. It should further that FIG. 4D is illustrative for providing an example for the purchase of an item for sale. It should be understood, however, the cards can be authored with triggers for a wide variety of actions besides purchasing an item, such as the reservation or booking of goods and/or services, online chats, GPS related services and functionality, etc.

Desktop Authoring Tools

In commonly assigned U.S. application Ser. No. 14/740, 539 filed Jun. 16, 2015 and PCT Application PCT/US15/ 050478 filed Sep. 16, 2015, both entitled "Authoring Tool for the Authoring of Wrap Packages of Cards, an authoring tool for the authoring of wrap a packages mainly in a non-mobile environment is described, for example, using personal computers, workstations and laptops. The authoring process generally involves the selection of a card template, creating a card by duplicating the card template, and then editing the card to include desired content, functionality and/or services. As the cards are authored, they are placed in one or more linear sequences, which defines the sequential order in which the cards are rendered in response to navigational inputs when the wrap is consumed. As previously noted, wraps can be authored to include a wide variety of (i) media, (ii) application functionality and/or (iii) e-commerce related services. For more detail on the authoring tool, see the above-identified authoring tool applications, both incorporated by reference herein for all purposes.

Mobile Authoring

In U.S. Provisional Application No. 62/211,310 (WRAP P0025P) filed Aug. 28, 2015, 62/248,644 (WRAP P025P2) filed Oct. 30, 2015 and 62/298,723 (WRAP P025P3) filed Feb. 23, 2016, a mobile-first authoring tool for the authoring of wrap packages on a mobile device is disclosed. Each of the above-listed applications is incorporated herein by reference for all purposes.

The mobile-first authoring tool enables the authoring of wrap packages on mobile devices, such a mobile phones and tablets. The authoring tool, since developed for mobile, leverages many of the features and user interfaces commonly found on mobile phones and tablets. The authoring tool takes advantage of touch-sensitive displays, allowing authors to create and cards and manipulate content using common screen-inputs, such tapping, scrolling, drag and dropping and swiping. The mobile authoring tool also leverages other media capturing and rendering hardware found on mobile devices, such as a still and/or video camera, microphones for audio recording, internal speakers and/or external speaker ports for use with headsets, earbuds, and the like.

In a non-exclusive embodiment, the aforementioned mobile authoring tool is an application or "app" developed for any number of different mobile operating systems commonly used by mobile devices, such as iOS by Apple or Android by Google. As such, the mobile authoring tool is intended to be distributed through Apple's App Store or the Google Play Market. It should be understood that the above-listed operating system platforms and distribution channels are merely exemplary and should in no way be construed as limiting. On the contrary, the mobile authoring tool of the present application may be distributed through any channel and/or developed for any operating system, mobile or otherwise, currently known or developed in the future.

Once the authoring tool is downloaded onto a mobile device, it will typically appear as an "app" icon on a display view of the device. By tapping or otherwise selecting the icon, the mobile authoring tool is launched, opens and appears on the display of the mobile device.

Card Mixing—Desktop Authoring Environment

Figure 5A:
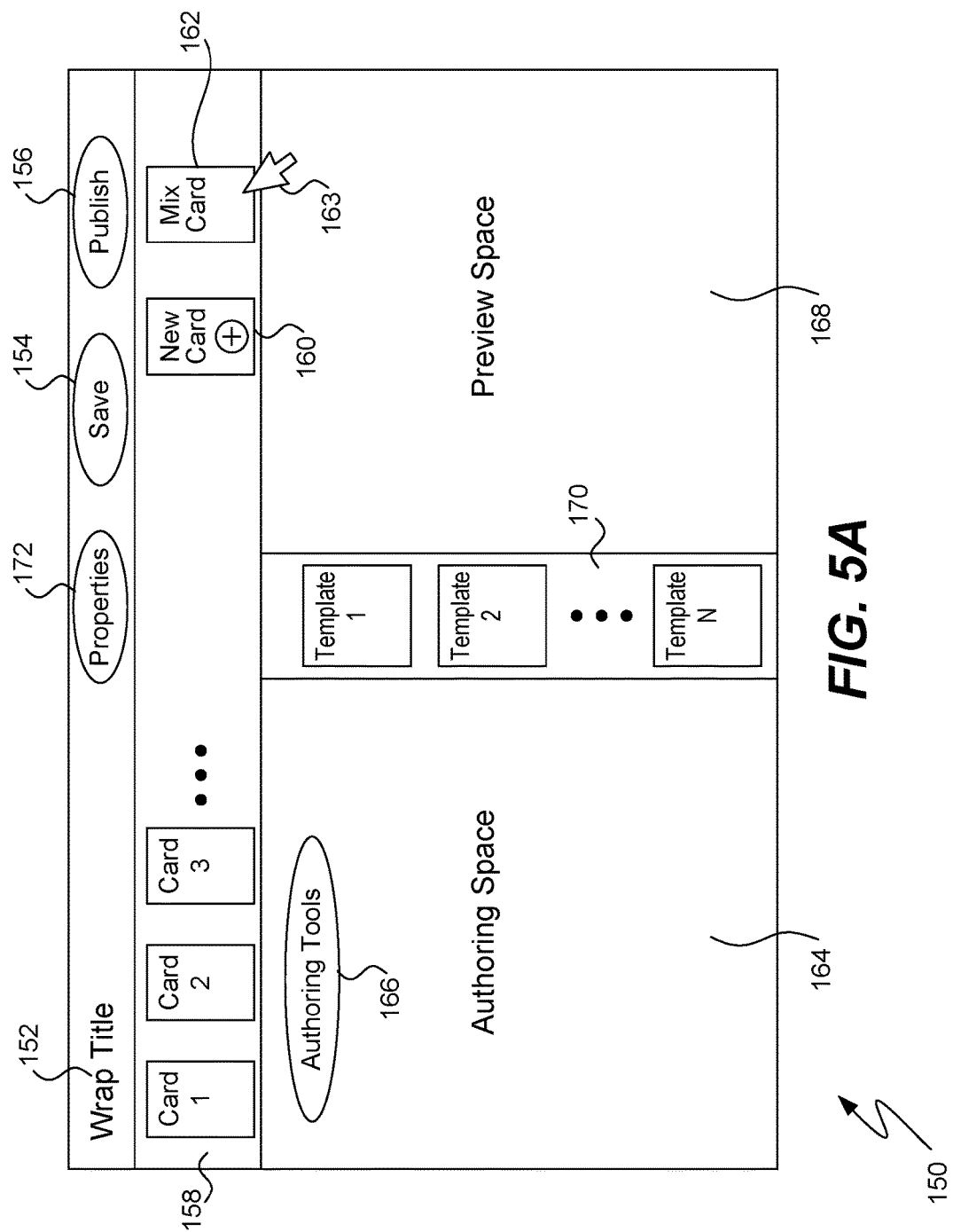
FIG. 5A through FIG. 5C are diagrams illustrating a mixing of a card into a wrap package using an exemplary desktop authoring tool in accordance with a non-exclusive embodiment of the invention.
Figure 5B:
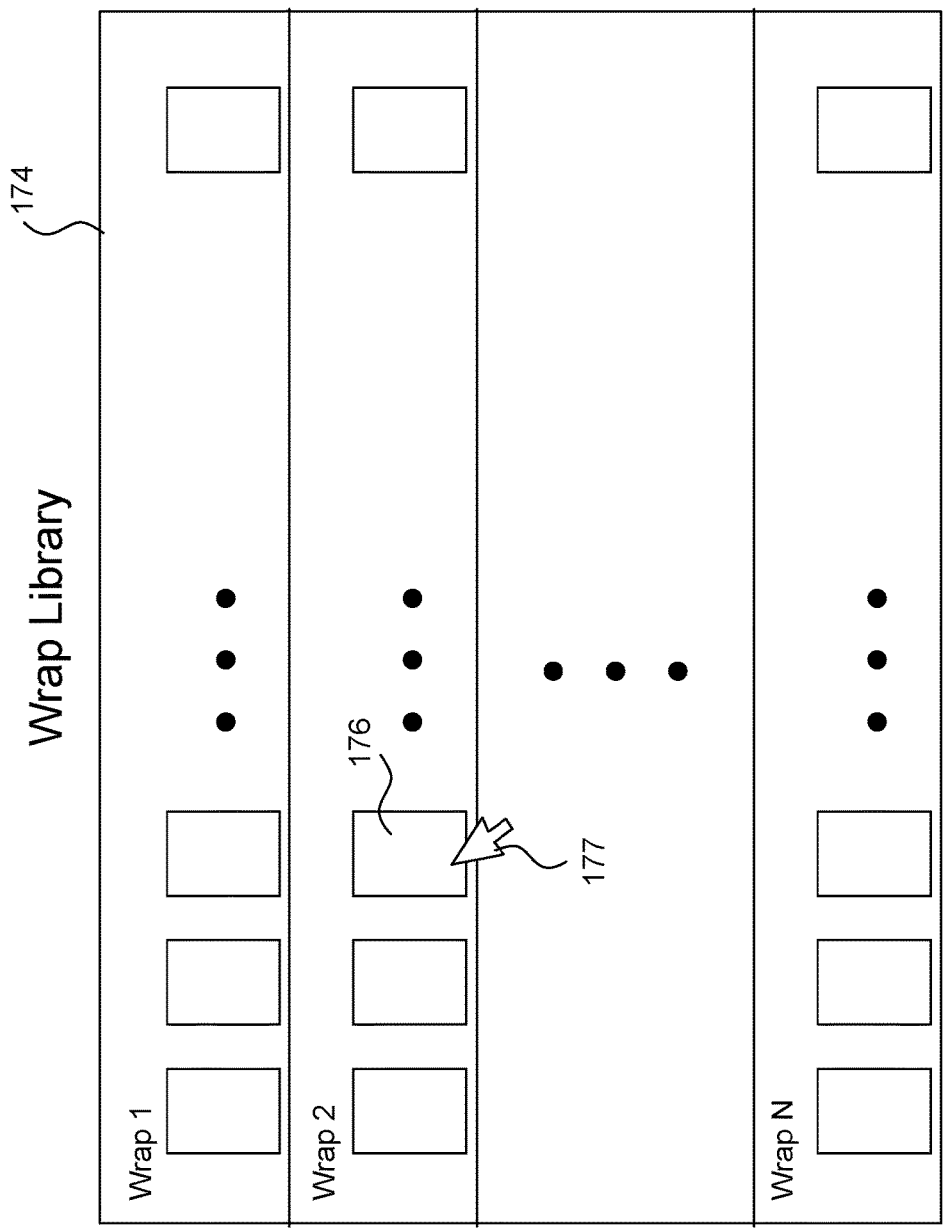
Figure 5C:
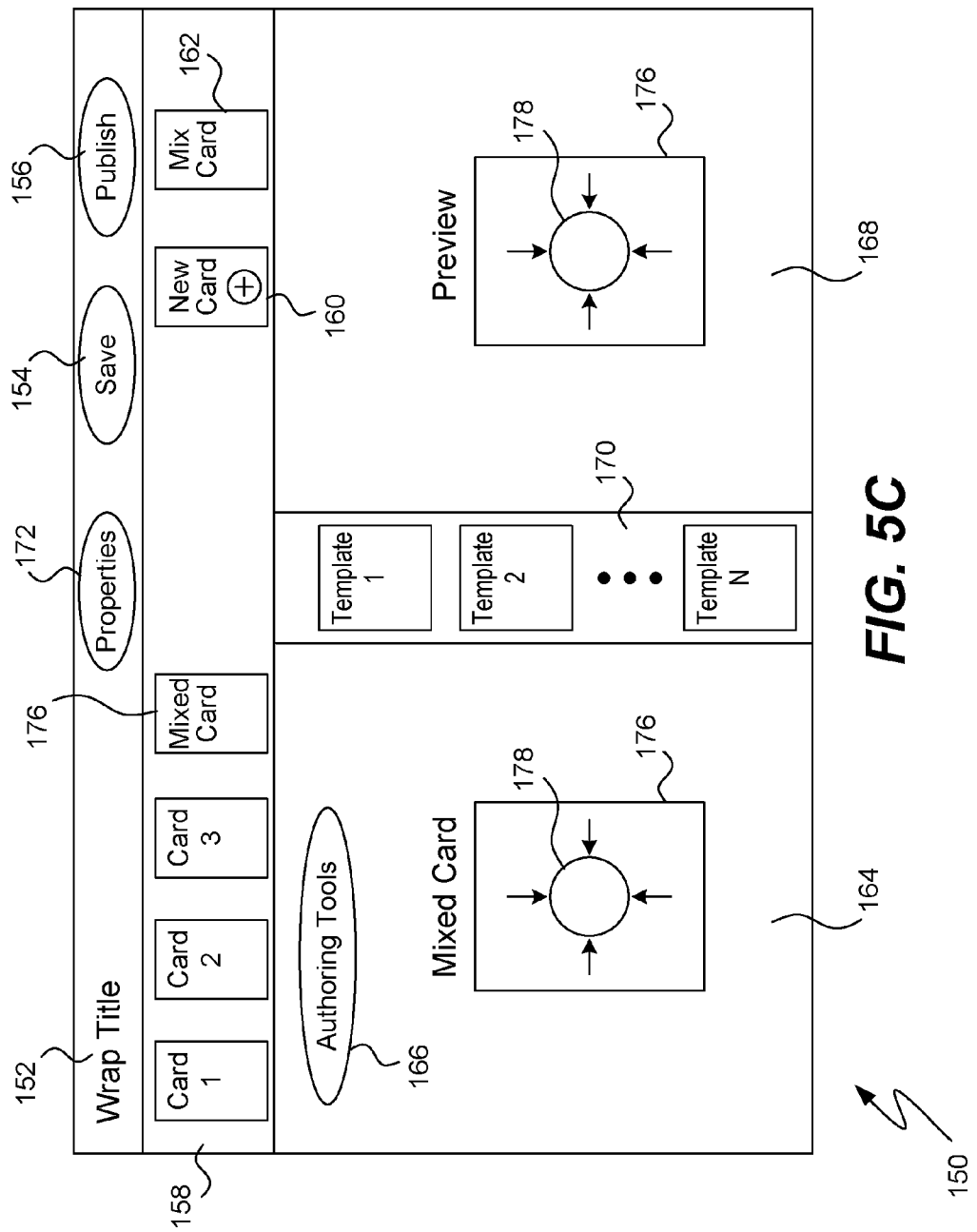

Referring to FIGS. 5A through 5C, a series of diagrams illustrating the mixing of a card from another wrap into a wrap that is being authored in a desktop environment is illustrated.

FIG. 5A illustrates a desktop authoring environment 150, which includes a tool 152 for defining a title for the wrap package being authored, a save button 154 and a publish button 156.

The environment 150 also includes a card sequencing space 158 which is used to define a sequence order for the cards of the wrap (e.g., card 1, card 2, card 3, etc.). The card sequencing space 158 further includes, in this non-exclusive embodiment, a new card tool 160 and a card mixing tool 162. The new card tool 160 enables the creation of a new card for the wrap. As described in more detail below, when the mixing tool 162 is selected (as represented by the curser arrow 163), the author may mix a card from an existing wrap into the wrap being authored.

The authoring environment 150 further includes an authoring space 164, a set of authoring tools 166 for adding components to cards, a preview space 168 and a card template space 170, including a number of different card templates (e.g., template 1, template 2, etc.).

The authoring environment 150 also optionally includes a properties button 172. When selected, a properties tool is invoked, which allows the author to set certain properties for the wrap, or individual cards of the wrap, as described in more detail below.

When a card from another wrap is to be mixed into a wrap currently being authored, the card mixing tool 162 is selected. Thereafter, as described in more detail below, a card is selected out of a wrap library for mixing.

FIG. 5B illustrates a wrap library 174, which stores or maintains various existing wrap packages. In this example, the library is organized into a number of rows (1 through N). Within in each row, the cards of a wrap are displayed in their horizontal sequence order.

When the card mixing tool 162 is selected, the author accesses the wrap library 174 and can peruse the various stored wrap packages and select a card for mixing. In this illustrative example, the third card 176 of the wrap in the second row is selected, as represented by the curser arrow 177.

FIG. 5C illustrates the authoring environment 150 after the card 176 has been selected for mixing. In the sequencing space 158, the mixed card 176 appears. In addition, the mixed card 176 also appears in the authoring space 164 and the preview space 178. In the authoring space 164, the author can customize the mixed card using the set of authoring tools 166. For example, the author can add text components, image/photo components, video components, styles, behaviors, etc. In the exemplary embodiment shown, the author has added a drawing component 178. As described in more detail below, the additional components are not directly added to the mixed card per se, but rather, to a card overlay. As a result, the added components appear as part of the card at runtime. As any customization is performed, the new components and/or edits are presented for preview in space 168. In this manner, the author can preview the overlay and card as they will be rendered at runtime.

The location of the mixed card 176, within the over all sequence order of the wrap package, can also selected or defined by the author. For example, the author can select, drag and drop the various cards, including the mixed card 176, into any desired order in sequenced space 158. By defining the order of the cards in space 158, the author can define the one or more sequence orders of the cards of the wrap package at runtime. As any of the cards may be a gallery card, the author thus has the ability to define one or more sequence orders that run (i) horizontally, (ii) vertically or (iii) both horizontally and vertically.

It should be noted that in the example above, a non-gallery card was selected as the card to be mixed into the authored wrap. It should be understood, however, that this is by no means a restriction. Any card, including a gallery card, regardless of the content, structure or layout, or any type of component contained therein, may be mixed into a wrap being authored.

Once an authoring session is complete, the author may optionally select the save button 154. When this occurs, the authoring tool generates (i) individual card descriptors for each card in the wrap, including any mixed cards and (ii) a wrap descriptor for the wrap package. A detailed explanation of this process is provided below with respect to FIGS. 8A and 8B.

Card Mixing—Mobile-First Authoring Environment

Figure 6A:
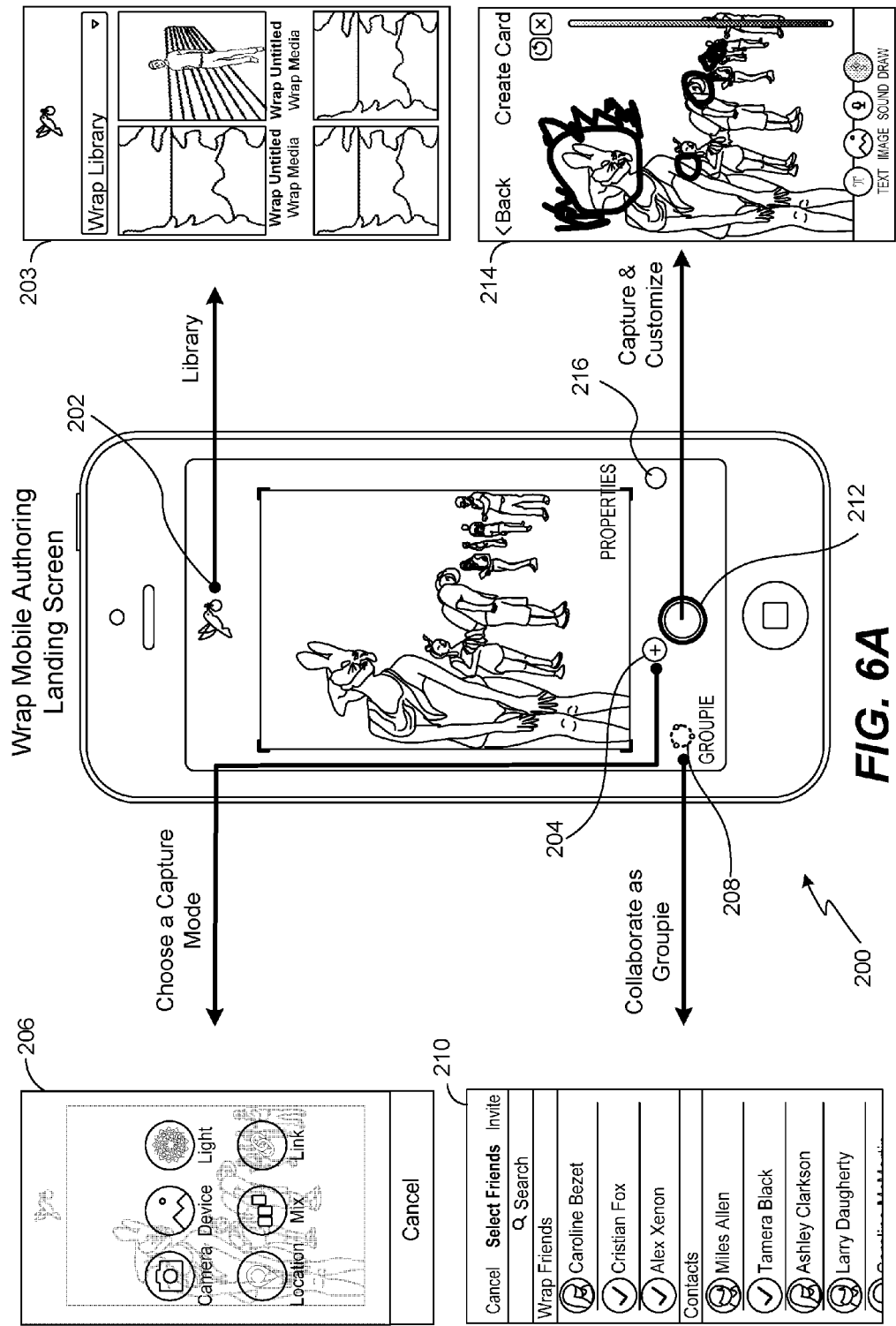
FIG. 6A through FIG. 6C are diagrams illustrating a mixing of a card into a wrap package using an exemplary mobile-first authoring tool in accordance with a non-exclusive embodiment of the invention.
Figure 6B:
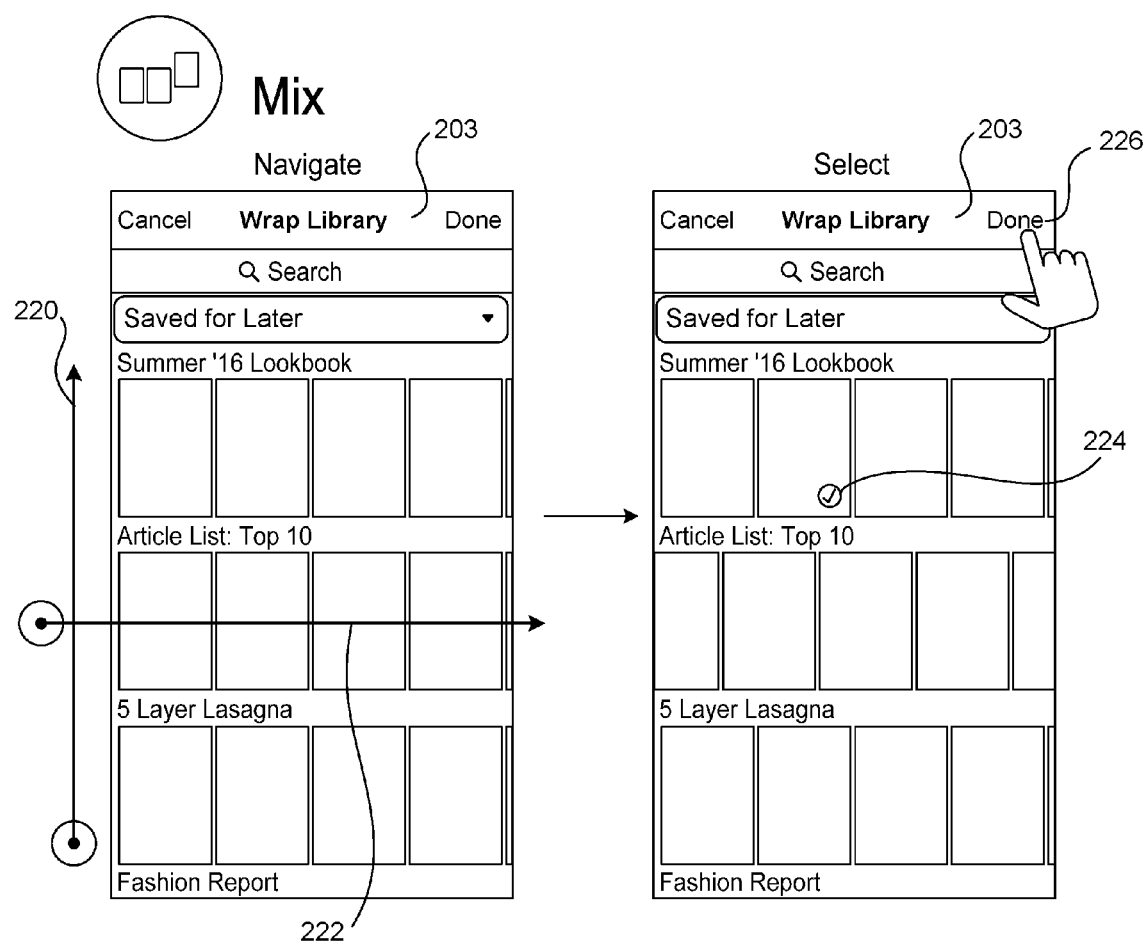
Figure 6C:
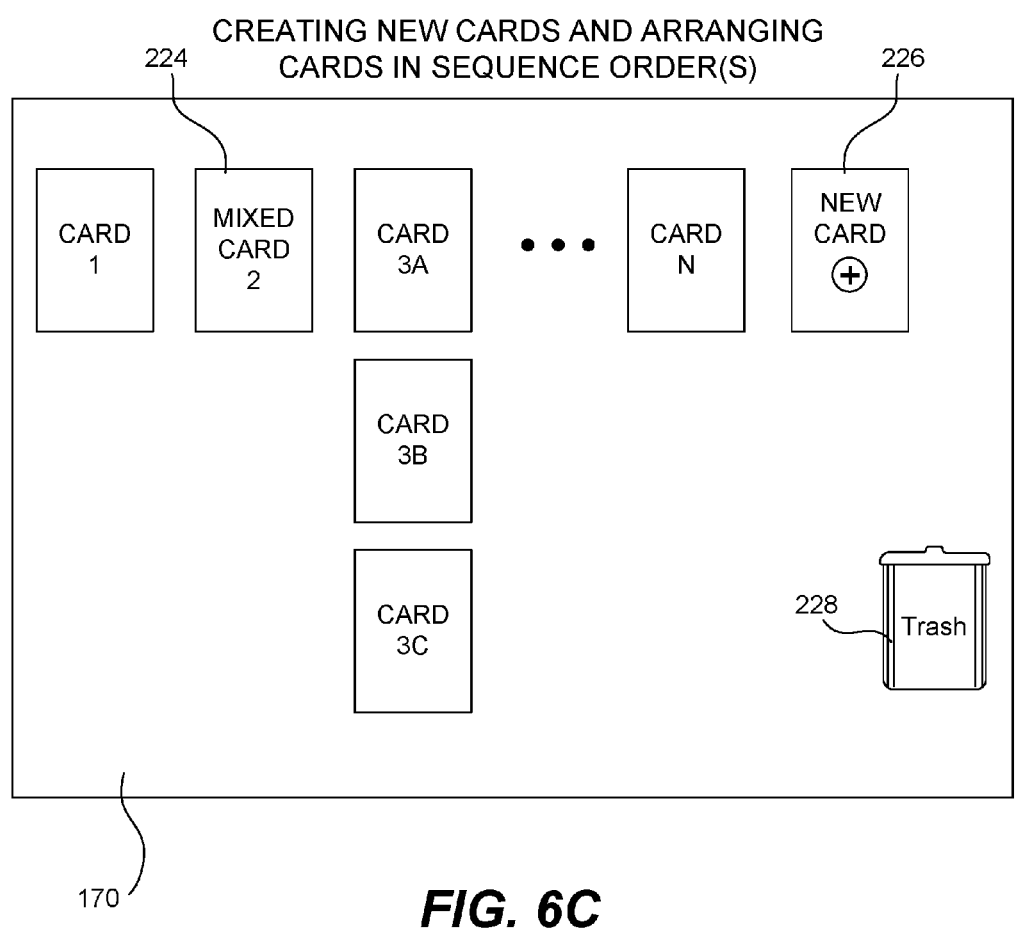

Referring to FIGS. 6A through 6C, a series of diagrams illustrating the mixing of a card from another wrap into a wrap that is being authored in a mobile-first environment is illustrated.

In FIG. 6A, a non-exclusive embodiment of an exemplary landing screen 200 for a mobile authoring tool is illustrated. In this embodiment, the landing screen 200 includes a number of buttons and features, including a library button 202. When selected, a screen transition occurs displaying the wraps contained in a library 203. The landing screen 200 also includes other buttons such as a new card button 204, which results in a screen transition that displays various media capture modes for creating media for new cards, a collaboration button (labeled "GROUPIE" in the embodiment shown) 208 that causes a transition to a contacts list 210 when selected, a capture button 212 that is used to capture media, such as a photo or video using a built-in camera on the mobile device. When the capture button 212 is invoked, the captured media is displayed on the screen 214, as illustrated in this embodiment. The landing screen 200 also includes a properties button 216 that transitions to a screen (not illustrated) that allows an author to set various properties for a wrap and/or cards that is/are being authored. For a more detailed explanation of elements 204 through 216, see the above referenced US provisional applications directed to a mobile-first authoring tool.

As depicted in the left screen shot of FIG. 6B, the library 203 includes a number of rows. Within each row, the cards of a given wrap are displayed in their horizontal sequence. By navigating through the various wraps, as represented by the vertical arrow 220, and the various cards of a given wrap, as represented by the horizontal arrow 222, any card in the library 203 can be selected for mixing.

As depicted in the right screen shot of FIG. 6B, a particular card 224 has been selected for mixing, as represented by the checkmark. When a "Done" icon 226 is selected, the card 224 is selected for mixing.

As illustrated in FIG. 6C, a screen shot provided within the mobile-first authoring environment is illustrated. In this particular example, the mixed card 224 is depicted as the second card in the horizontal sequence of the wrap. It should be understood that various tools are provided for arranging the cards in any sequence order. For example, the various cards, including the mixed card 224, may dragged and dropped into any horizontal and/or vertical sequence order.

In addition a new card tool 226 is provided for adding new cards and a trash can 228 is provided for deleting card(s) from the wrap, by a drag and drop operation, for example.

Customizing Mixed Cards

Figure 7:
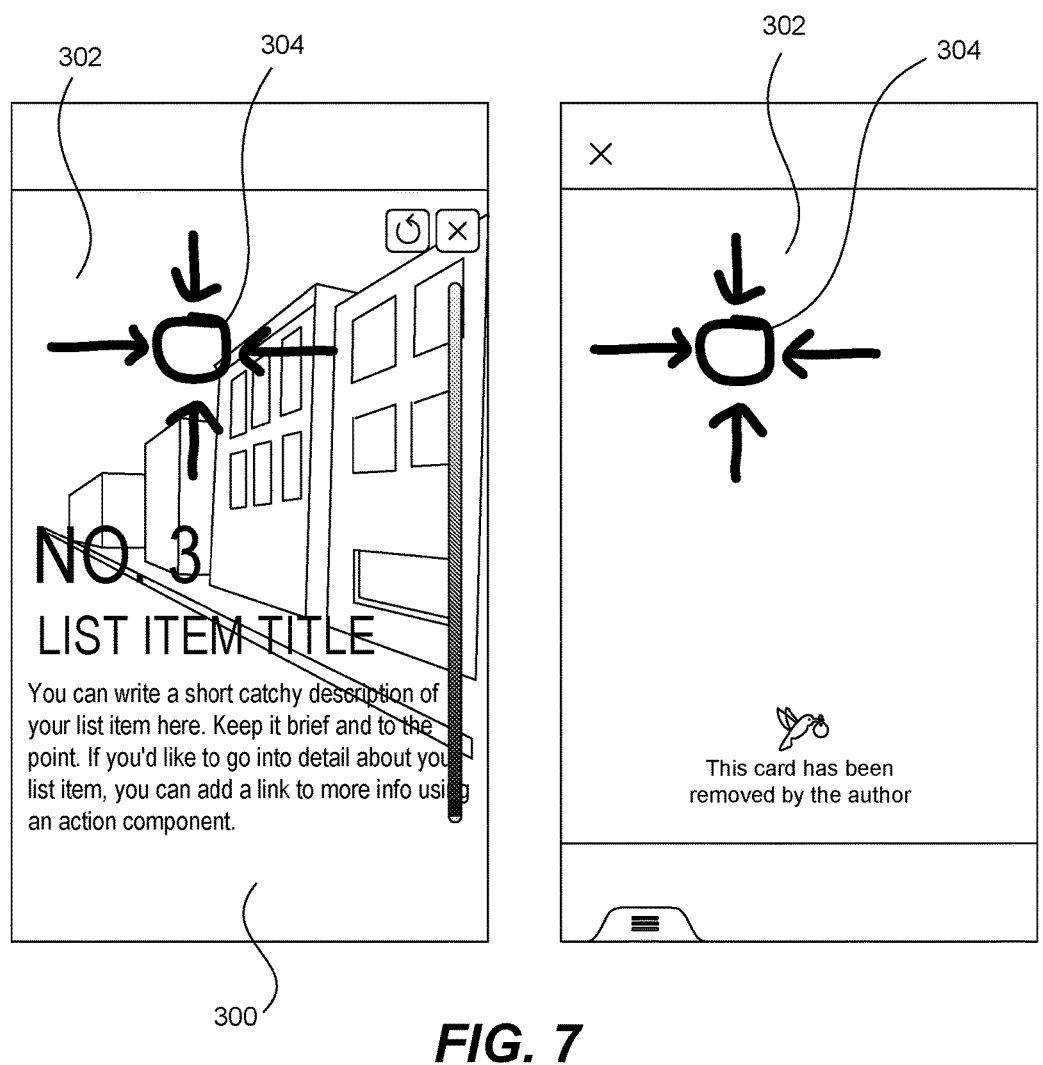
FIG. 7 is a diagram illustrating an overlay used for customizing a mixed card in accordance with a non-exclusive embodiment of the present invention.

Referring to FIG. 7, a diagram illustrating a non-exclusive embodiment for the customization of a card 300 mixed into the wrap is illustrated. In this embodiment, a card overlay 302 is created when a card from another wrap is mixed into a wrap being authored, as previously noted. Initially, the overlay layer 302 is transparent, meaning it essentially a blank canvas that can be authored in any manner desired by the author. The author can then optionally rely on various authoring tools to create text, image sound and/or drawing components, styles and/or behaviors as described in the above-identified desktop and mobile-first authoring wrap authoring patent applications. The custom component(s), styles and/or behaviors, however, are created or associated with the overlay layer 302, not the underlying mixed card 300 per se.

In the specific example as illustrated in the left screen shot, a drawing component 304 has been created using a draw tool and applied to the overlay 302. With this approach, the mixed card 300 as originally created remains intact and is controlled by the original author. As a result, if the original author wishes to modify the original card 300, those changes will appear in the mixed card 300 of the wrap being authored. Alternatively, if the original author deletes the original card 300, then the mixed card 300 is removed from the wrap. For example, as illustrated in the right screen shot, the author has deleted the original card 300. As a result, just the overlay layer 302, with the drawing 304 in this case, remains in the wrap package being authored.

It should be understood that the drawing 304 is provided just for illustrative purposes. In real-world situations, an author could create any number of components, styles, and/or behaviors for a given overly 302 for a mixed card 300.

It should be noted that in various alternative embodiments, an overlay 302 does not necessarily have to be used. For example, if the author of a wrap does desire to use a mixed card "as is" without customization, then there is no need to create an overlay layer 302. Alternatively, a mixed card 300 can be copied from its originating wrap and then edited by, for example, directly adding or removing components to the card itself. With this latter approach, however, the original author no longer has the ability to control usage of the mixed card in the wrap being authored.

Properties and Permissions

Referring to FIG. 8, a properties and permission tool 320 for enabling the author to selectively designate properties and permissions for an authored wrap, or individual cards, is illustrated. When either the property button 172 (in the desktop environment) or button 216 (in the mobile environment) is selected, the tool 320 is presented to the author. In this non-exclusive embodiment, the tool 320 includes a first section 322 that enables the author of a wrap package to set properties and permissions for the wrap package on a global basis. For example, the wrap can be named (or renamed if already assigned a name). In addition, the author can set permissions to let others share, edit, mix and/or declare the wrap public or private by selecting the appropriate Yes/No boxes. The permission tool 320 also includes a second section 324 that enables the author to grant or deny others the permission to edit, share, delete, mix and/or make public or private individual cards on a card-by-card basis. Again, by selecting either the Yes or No options for each card (e.g., Card 1, Card 2, Card 3 through Card N), the property and/or permissions for each card can be set. Finally, a tag field 326 is provided, allowing the author to assign a tag to the wrap. A few examples of tags defined by an author may include (i.e. fashion, favorite wraps, product wraps, lifestyle wraps, funny wraps, etc.).

Wrap and Card Descriptors

When an authoring session of a wrap using the mobile authoring tool is complete, for example a save function is invoked (e.g., button 154 in the desktop environment 150 or an equivalent function in the mobile environment), a background process is performed for the purpose of generating (a) a card descriptor of each card in the wrap and (b) a wrap descriptor including all the card descriptors. As explained in more detail below, generating a card descriptor for a given card is an iterative process. For each card, data object(s) are generated for each component, its contents, and any attributes, styles, triggers and/or behaviors associated with the component. After the data component(s) are generated for the first component, the above process is successively repeated for (a) each component in the card and (b) for each card in the wrap.

Figure 9A:
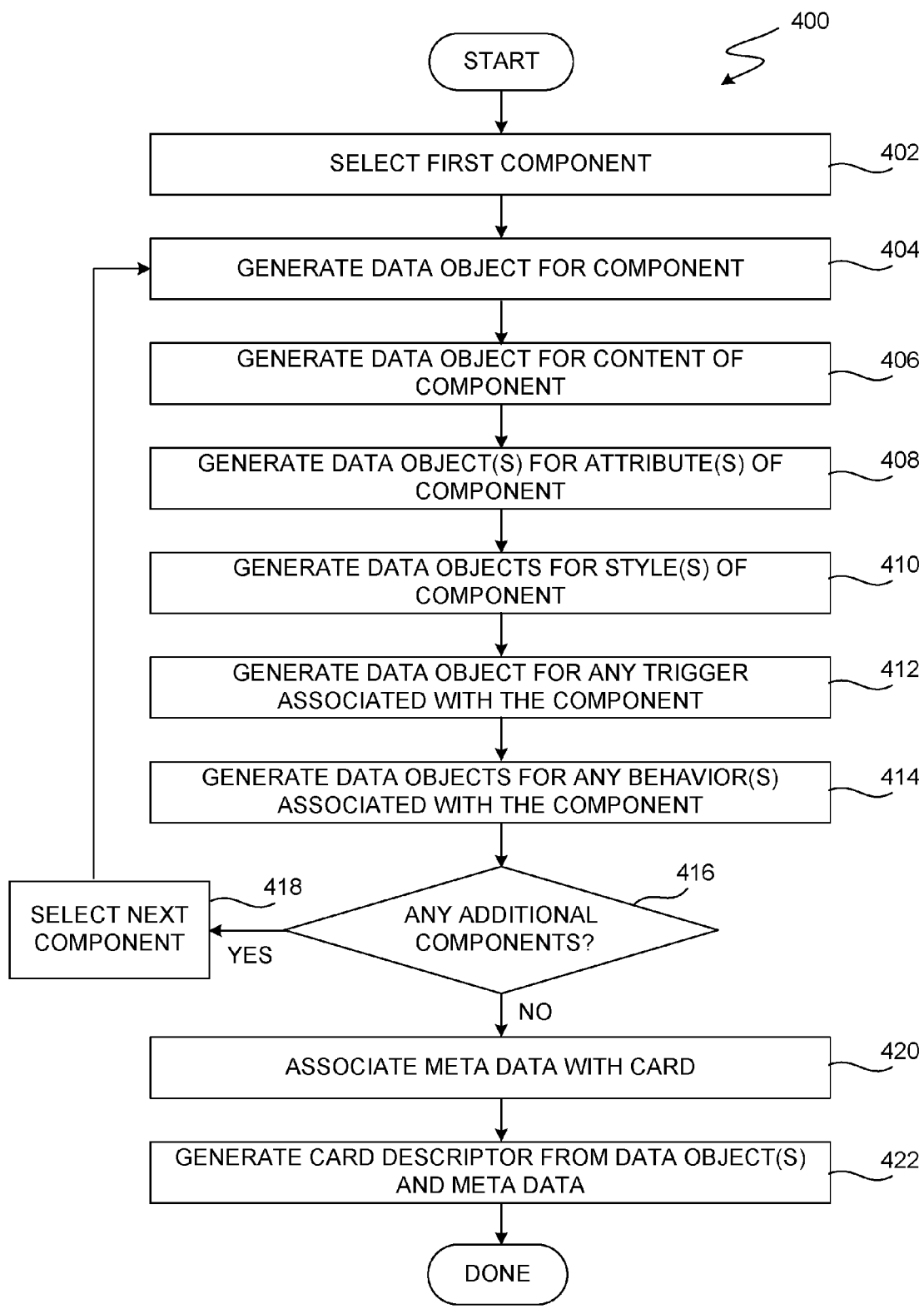
FIG. 9A is a diagram illustrating a sequence for generating a card descriptor for a card of a wrap package performed by an authoring tool.

Referring to FIG. 9A, a flow chart 400 illustrating the steps of generating a card descriptor for a card of a wrap in accordance with a non-exclusive embodiment is shown. In initial step 402, a first component of the card is selected. Thereafter, data object(s) are generated for the component (step 404) along with any included or associated content (step 406), attribute(s) (step 408), style(s) (step 410), trigger(s) (step 412) and/or declared behavior(s) (step 414) associated with the component. In decision step 416, it is determined if there are any additional components associated with the card. If yes, then in step 418 another component is selected and steps 404 through 416 are repeated for the selected component. The above process is repeated for all the components of the card.

When there are no more components as determined in decision 416, then any meta data is associated with the card in step 420. Meta data may include, but is not limited to, information such as a unique card ID assigned to the card by the authoring tool, the name of the originating author, a version of the card, properties and permissions status for the card, a list of contact(s) who are permitted to collaborate in the authoring and/or customization of the card, etc. Finally, the card descriptor is generated from all the data object(s) and meta data (step 422) for the card. The card descriptor thus contains everything needed to render the card at runtime.

In accordance with various embodiments, a card descriptor for a mixed card may be generated in a number of different ways. In one embodiment, the card descriptor from the originating wrap may be copied. In another embodiment, the card descriptor may be referenced. In yet another embodiment, the sequence of FIG. 9A may be applied to the mixed card, resulting in the generation of a duplication card descriptor of the original.

In addition, for any mixed card, one or more objects are also generated for any customized components added to any overlay layer 302 using the aforementioned process. The overlay data objects are then included with or otherwise associated with the card descriptor for the mixed card so that customization features are rendered along with the mixed card at runtime.

Figure 9B:
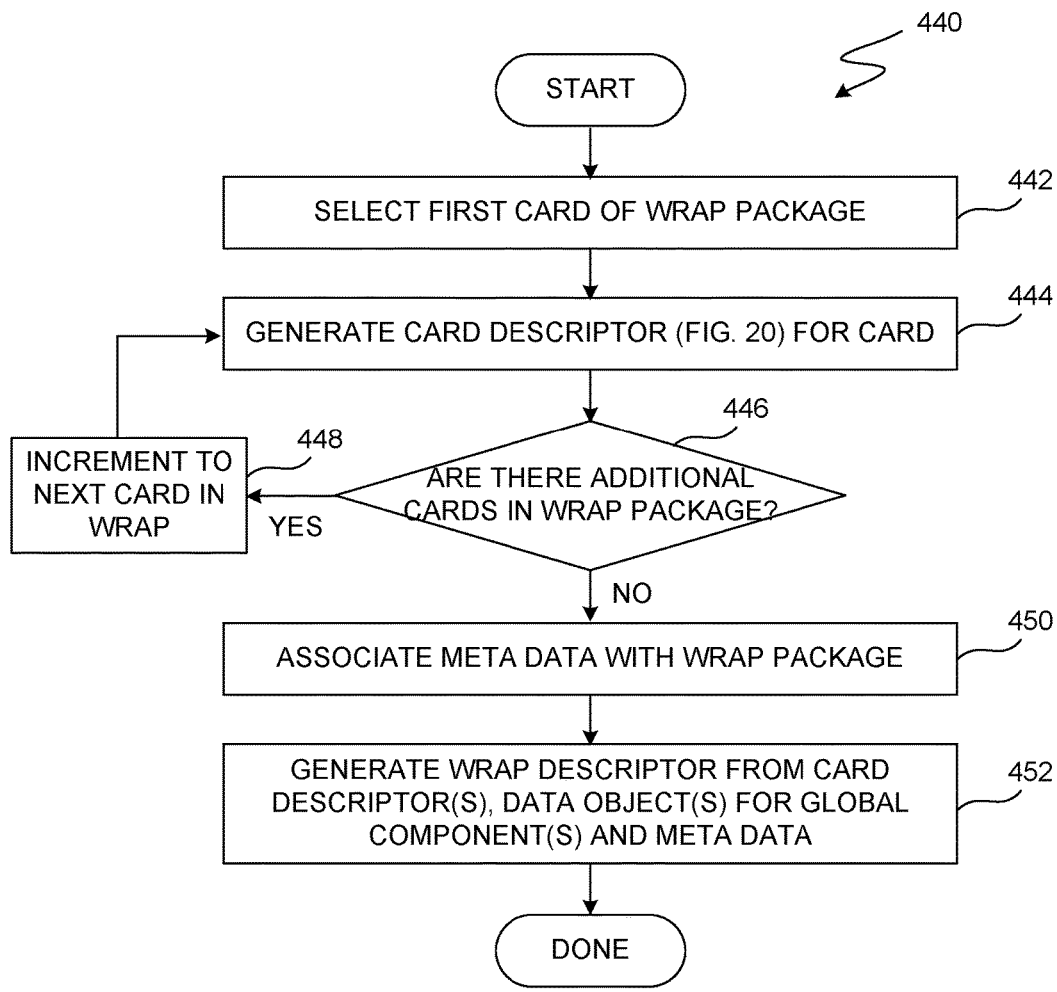
FIG. 9B is a diagram illustrating a sequence for generating a wrap descriptor for a wrap package performed by the authoring tool.

Referring to FIG. 9B, a flow diagram 440 illustrating the steps of generating a wrap descriptor for the authored wrap package is illustrated. In the initial step (442), the first card of the wrap is selected and its card descriptor is generated (step 444) using the process described above with respect to FIG. 9A. Thereafter, in decision 446, it is determined if there are any additional cards in the wrap package. If yes, then next card in the wrap is incremented (step 448) and the card descriptor for that card is generated in step 444. This process is repeated until a card descriptor is generated for all the cards in the wrap, as determined in decision 446. Once all the card descriptors are generated, meta data is associated with the wrap in step 450. Such meta data may include, but is not limited to, a unique wrap ID, name of the originating author, a version of the wrap, the properties and permissions status for the wrap, a list of contact(s) who are permitted to collaborate in the authoring and/or customization of the wrap, etc. Finally, in step 452, the wrap descriptor is generated from the all the card descriptors and/or any media data associated with the wrap. The net result of the above-described background process is the generation of a wrap descriptor for the wrap package. The wrap descriptor (a) defines all the cards of the wrap package and (b) includes a plurality of card descriptors for the cards of the wrap package respectively. Each card descriptor defines the content, structure and a layout of an associated card respectively. As previously noted, the wrap descriptor and the individual card descriptors may be represented in JSON, BSON or in a markup language, such as XML, HTML, etc.

Distribution and Sharing of Authored Wrap Packages

Once a wrap has been authored, it may be shared and distributed with others in numerous ways. For example, a unique wrap identifier associated with the wrap can be included in a message, such as an email or text, and sent to one or multiple recipients. Alternatively, a wrap cover, including the wrap identifier embedded therein, may be created. The wrap cover may then be inserted into a web site, an application, in email message(s), and/or text message(s). In yet other embodiments, the wrap identifier and/or a corresponding wrap cover may be inserted into a social media feed, such as but not limited to, Facebook, Twitter, Pinterest, etc. Regardless of the delivery method, when a wrap identifier and/or cover is selected, the corresponding wrap descriptor is delivered to the requesting device. In response, a runtime engine processes the wrap descriptor and generates a runtime instance of the wrap package. In various embodiments, the runtime engine may be included in a native "app" that already resides on the consuming device. In situations were a native app is not present, a runtime engine may be delivered to the requesting device in cooperation with the delivery of the wrap descriptor. In this way, the wrap can be rendered without the native app.

For more details on the distribution of wrap packages and the operation and distribution of the runtime engine, see commonly assigned U.S. application Ser. No. 14/878,148, entitled Card Based Package for Distributing Electronic Media and Services, filed Oct. 8, 2015, incorporated herein for all purposes.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. An authoring tool, embedded in a non-transitory computer readable medium, comprising:
   a new card tool for creating and adding one or more cards to a first wrap package authored using the authoring tool;
   a card mixing tool for mixing a card, selected from a second wrap package, into the first wrap package authored using the authoring tool; and
   a set of component authoring tools for selectively adding components to the one more cards and the mixed card of the first wrap package,
   wherein, the authoring tool is further configured to generate a JSON wrap descriptor for the first wrap package, the JSON wrap descriptor comprises a plurality of JSON card descriptors for the one or more cards and the mixed card, the plurality of JSON card descriptors arranged to define content and a layout of an associated card respectively,
   wherein generating the JSON card descriptor for the mixed card is generated by one of the following:

(a) copying the JSON card descriptor for the mixed card from the second wrap package;
(b) referencing the JSON card descriptor for the mixed card included in the second wrap package; or
(c) generating the JSON card descriptor for the mixed card when generating the JSON wrap descriptor for the first wrap package.

2. The authoring tool of claim 1, further configured to:
create an overlay associated with the mixed card;
associate one or more components created using the set of component authoring tools to the overlay; and
associate the overlay, with the one or more associated components, to the mixed card.

3. The authoring tool of claim 1, wherein the authoring tool is further configured to generate a JSON descriptor for the overlay, including the one or more associated components.

4. The authoring tool of claim 3, further configured to associate the overlay descriptor with the JSON card descriptor for the mixed card.

5. The authoring tool of claim 1, wherein the JSON wrap descriptor generated by the authoring tool is a Binary JSON (BSON) wrap descriptor.

6. The authoring tool of claim 1, wherein the set of component authoring tools enables the addition and/or editing of one or more of the following types of components:
(a) text;
(b) image/photo;
(c) sound;
(d) video; and/or
(e) drawing.

7. The authoring tool of claim 1, further comprising a sequencing tool for defining one or more sequence orders for the one or more cards and the mixed card in the first wrap package, the one or more sequence orders defining the order(s) in which the one or more cards and the mixed card of the first wrap package are rendered on a consuming device in response to navigational inputs, wherein the one or more sequence orders include:
(a) a horizontal sequence order;
(b) a vertical sequence order; and/or
(c) both horizontal and vertical sequence orders.

8. The authoring tool of claim 1, further comprising a mixing-permission tool for selectively designating if the one or more of the cards of the first wrap package can be mixed or not mixed into another wrap package.

9. The authoring tool of claim 1, further configured to generate the JSON wrap descriptor for the wrap package by:
(a) generating the plurality of JSON card descriptors for the one or more cards and the mixed card of the first wrap package respectively; and
(b) generating the JSON wrap descriptor from the plurality of JSON card descriptors.

10. The authoring tool of claim 9, wherein generating the plurality of card descriptors for the one or more cards and the mixed card of the first wrap package further comprises:
(c) selecting a first card among the plurality of cards of the first wrap package;
(d) generating data object(s) for each component associated with the select card;
(e) generating the JSON card descriptor for the select card from the data object(s) generated for each component associated with the select card; and
(f) generating the plurality of JSON card descriptors by repeating steps (c) through (e) for each of the one or more cards of the first wrap package respectively.

11. The authoring tool of claim 10, further comprises generating the data object(s) for one or more of the following associated with the selected card:
(g) media content;
(h) attribute(s);
(i) style(s);
(j) trigger(s);
(k) behavior(s).

12. The authoring tool of claim 1, wherein the first wrap package is configured to be rendered on a display associated with a computing device so that within each card including the mixed card, a same relative positioning of the content is maintained regardless of the size and/or type of the display.

13. The authoring tool of claim 1, wherein the one or more cards and the mixed card of the first wrap package are configured to be swipe-browsed in the one or more linear sequence(s) when the display associated with the computing device is touch-sensitive.

14. An authoring tool, embedded in a non-transitory computer readable medium, for authoring a set of cards of a first wrap package including a card mixing tool for mixing a card from a second wrap package into the first wrap package, the authoring tool further configured to generate a JSON wrap descriptor for representing the first wrap package, the JSON wrap descriptor including a plurality of JSON card descriptors for the set of cards, including the mixed card, the plurality of JSON card descriptors arranged to define content and a layout of an associated card respectively,
wherein generating the JSON card descriptor for the mixed card is generated by one of the following:
(a) copying the JSON card descriptor for the mixed card from the second wrap package;
(b) referencing the JSON card descriptor for the mixed card included in the second wrap package; or
(c) generating the JSON card descriptor for the mixed card when generating the JSON wrap descriptor for the first wrap package.

15. The authoring tool of claim 14, further including a sequencing tool for defining one or more sequence orders for the set of cards including the mixed card in the first wrap package.

16. The authoring tool of claim 14, further including a set of authoring component tools for selectively adding components to the set of cards including the mixed card.

17. The authoring tool of claim 16, wherein any components added to the mixed card using the set of authoring component tools are applied to an overlay associated with the mixed card and not applied directly to the mixed card.

* * * * *